United States Patent [19]
Takeuchi et al.

[11] Patent Number: 5,305,379
[45] Date of Patent: Apr. 19, 1994

[54] SEMICONDUCTOR INTEGRATED DEVICE

[75] Inventors: Yusuke Takeuchi, Ohme; Masaru Kokubo, Hachiouji; Keizo Yabuta, Yokohama; Atuko Kenmoku, Mitaka; Kazuo Okado, Ohme, all of Japan

[73] Assignee: Hitachi, Ltd., Tokyo, Japan

[21] Appl. No.: 885,370

[22] Filed: May 19, 1992

[30] Foreign Application Priority Data

May 22, 1991 [JP] Japan ................... 3-146791
Mar. 11, 1992 [JP] Japan ................... 4-087839

[51] Int. Cl.5 ..................... H04M 1/00; H04J 3/00
[52] U.S. Cl. ..................... 379/410; 379/411; 379/345; 379/406; 370/32.1
[58] Field of Search ............ 379/3, 6, 406, 410, 379/411, 345; 370/32.1

[56] References Cited

U.S. PATENT DOCUMENTS

| 4,527,020 | 7/1985 | Ito | 379/410 |
| 4,760,596 | 7/1988 | Agrawal et al. | 379/410 |
| 5,113,389 | 5/1992 | Cox | 379/411 X |

Primary Examiner—James L. Dwyer
Assistant Examiner—Paul A. Fournier
Attorney, Agent, or Firm—Antonelli, Terry, Stout & Kraus

[57] ABSTRACT

A sending data buffer for holding sending data temporarily and transmitting the data to an echo canceler section is installed between a sending section and an echo canceler section of an echo canceler integrated circuit included in a subscriber line circuit of an integrated service digital network. The sending data buffer is operated in a shift register mode during a sending training mode, and operated in FIFO (first in-first out) mode during a sending/receiving training mode. Also, an adjustment function of the delay amount corresponding to the use setting is added.

27 Claims, 16 Drawing Sheets

FIG. 16
SHIFT REGISTER MODE (FL = H)
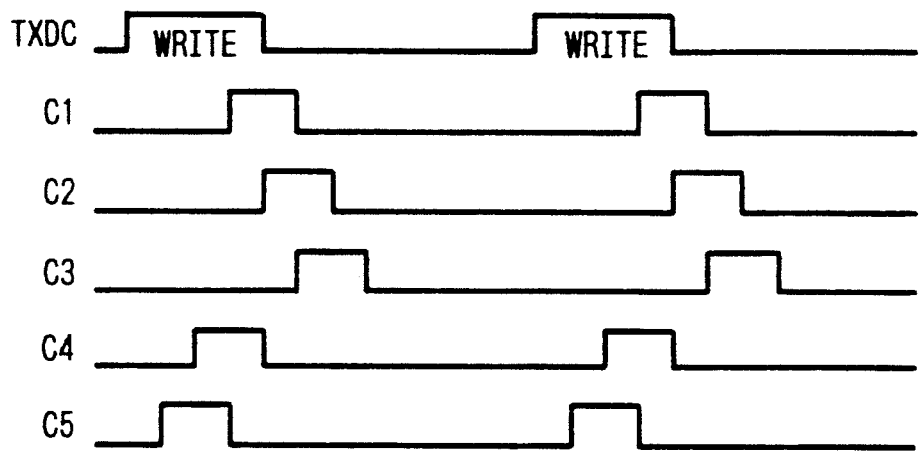
FIFO REGISTER MODE (FL = L)
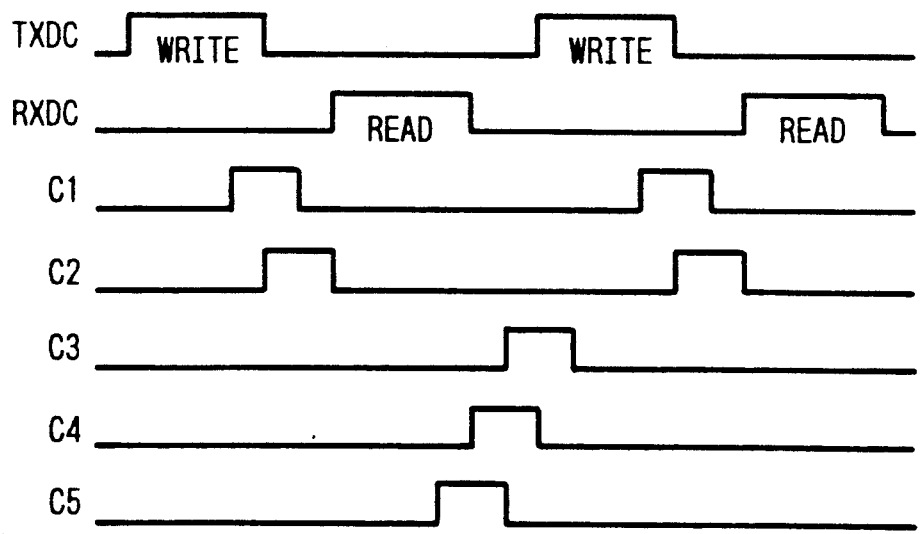

SEMICONDUCTOR INTEGRATED DEVICE

BACKGROUND OF THE INVENTION

The present invention relates to semiconductor integrated devices and, more particularly, to effective technology to be utilized, for example, in a semiconductor integrated device for an echo canceler being provided in a subscriber line circuit of the ISDN: Integrated Service Digital Network.

There is an integrated service digital network which carries out data transmission using analog transmission lines for telephone subscriber lines. The integrated service network is provided with a subscriber line circuit corresponding to each subscriber line. In the subscriber line circuit, sending data are converted into analog sending signals and sent out from a hybrid circuit into the subscriber line, and analog receiving signals, being inputted from the subscriber line through the hybrid circuit, are recovered into receiving data. That is, the subscriber line is a so-called bidirectional transmission path, and analog sending signals corresponding to analog sending data and analog receiving signals corresponding to analog receiving data are found simultaneously on the subscriber line. Therefore, the subscriber line is provided with an echo canceler for removing reflected noises generated corresponding to the sending data, that is, echoes from the analog receiving signals being received and for extracting the receiving data, and a training mode for getting echo-removed data being subjected to operation processing in removing the echoes is prepared.

An echo canceler (echo canceling device) for digital transmission is disclosed, for example, in Japanese patent application laid-open No. 245734/1987.

SUMMARY OF THE INVENTION

In the integrated service digital network, the training mode for getting the echo data is carried out prior to substantial data transmission. When sending from the receiving station is stopped and the sending data are sent from the sending station to the receiving station, the training mode is composed of the sending training mode for extracting echo data of the sending data being reflected through the hybrid circuit and transmitted to the sending station, and the sending/receiving training mode for obtaining the optimum phase, that is, the optimum discriminating point of analog receiving signals, being sent from both the sending station and the receiving station. In the echo canceler integrated circuit in the prior art as above described, sending data TD to form echo data are taken into an echo canceler section EC according to a receiving clock signal RXDC of the receiving section, as exemplified in FIG. 19. In the sending training mode, however, there is no problem as phases of receiving clock signals RXDC are fixed to a prescribed value, but in the sending/receiving training mode where phases of receiving clock signals RXDC are changed, as phases of the receiving clock signal RXDC are different from those of the sending data TD, there occurs the case where the sending data TD are transmitted to the echo canceler section EC in overlapping or the echo canceler section EC misses the sending data. Therefore, a problem occurs that time required for the training of a subscriber line circuit becomes longer resulting in the overtime in the worst case.

An object of the present invention is to prevent overlapping and missing of sending data at an echo canceler section such as an echo canceler integrated circuit.

Another object of the present invention is to shorten the training time of a subscriber line circuit including an echo canceler integrated circuit, and to prevent the overtime.

Still another object of the present invention is to prevent overlapping or missing of sending data in an echo canceler integrated circuit, and to attempt to expand the uses.

The foregoing and other objects and novel features of the present invention will become clear from the description of the specification and the accompanying drawings.

Brief description of the main improved aspects which are representative of the invention disclosed in the present patent application is as follows. An echo canceler section which is included in an echo canceler integrated circuit, included in a subscriber line circuit of the integrated service digital network, has a sending data buffer to hold sending data temporarily, and the sending data buffer is operated by shift register mode in the sending training mode, and is operated by FIFO (first in-first out) mode in the sending/receiving training mode. Moreover, the echo canceler integrated circuit is added with delay adjusting functions corresponding to its usage setting.

According to the above-mentioned means, even if relatively large phase difference occurs between sending clock signals and receiving clock signals of the echo canceler integrated circuit, the sending data can be transmitted to the echo canceler section without overlapping and missing. As a result, the training time of the subscriber line circuit including the echo canceler integrated circuit can be shortened and the overtime can be prevented. Further, by the above-mentioned delay adjusting functions, its use becomes possible in subscriber line equipment where phase difference is fixed by producing sending clocks based on receiving clocks.

BRIEF DESCRIPTION OF THE DRAWINGS

FIG. 16 is a signal waveform chart showing an embodiment of shift register mode and FIFO mode of the sending data buffer in FIG. 15;

DESCRIPTION OF THE PREFERRED EMBODIMENTS

Figure 1:
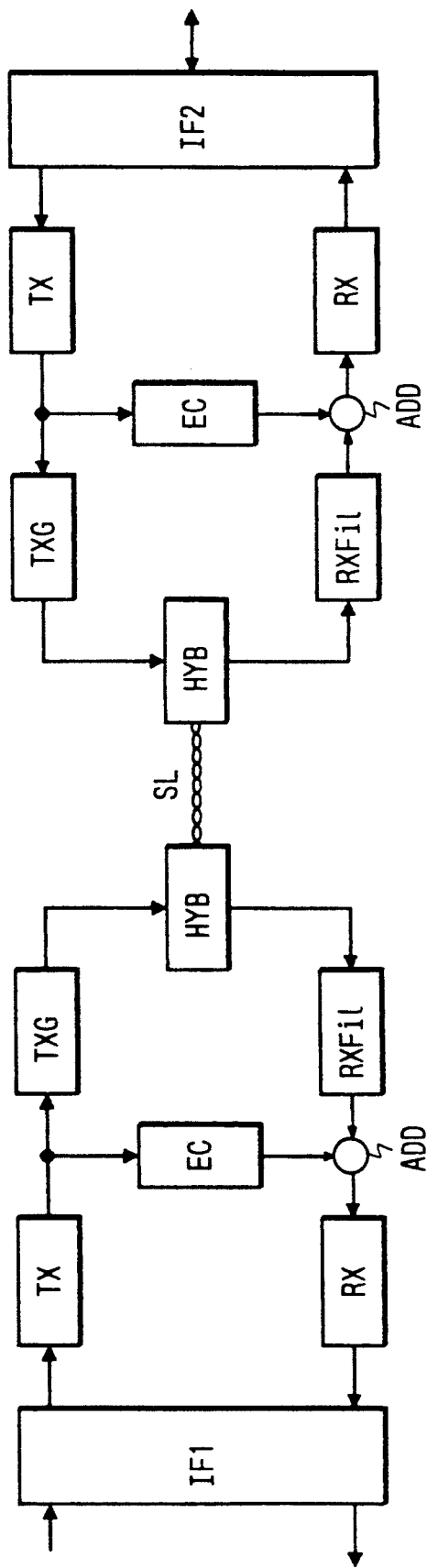
FIG. 1 is a block diagram showing an embodiment of a digital subscriber line transmission system to which the invention is applied.

FIG. 1 indicates a block diagram of an embodiment of a digital subscriber line transmission system to which the present invention is applied.

An interface IF1 constitutes a V-point interface and is responsive, for example, to the side of exchanger. Digital signals being sent through the interface IF1 are transmitted through a sending section TX to a sending data generating section TXG. Sending data produced by the sending data generating section TXG are transmitted through a hybrid circuit HYB to a subscriber line. As mentioned above, the subscriber line SL is a so-called bidirectional transmission path, on which analog sending signals corresponding to the sending data and analog receiving data corresponding to the receiving data are found simultaneously. Therefore, reflection noises being generated corresponding to sending data, that is echoes, must be removed from the analog receiving signals being received and the receiving data must be extracted. An echo canceler EC generates removing data supplied for calculation processing in removing such echoes.

Receiving data being received through the subscriber line SL including sending data (echo components) outputted from the sending data generating section TXG are fetched into a receiving data generating section RXFi1 through the hybrid circuit HYB, and the echo components of the receiving data and the echo component removing data produced by the echo canceler EC cancel out by an additive circuit ADD. A receiving section RX receives the receiving data with the echo components removed and transmits them through an interface IF1 to a data processing circuit on the side of exchanger.

Equipment on the side of subscribers, such as a telephone set being connected through the subscriber line SL as mentioned above is also provided with a hybrid circuit HYB, a sending section TX, a sending data generating section TXG, an echo canceler EC, an additive circuit ADD, a receiving data generating section RXFi1, a receiving section RX and an interface IF2 as mentioned above. The interface IF2 constitutes an S-point interface.

Figure 2:
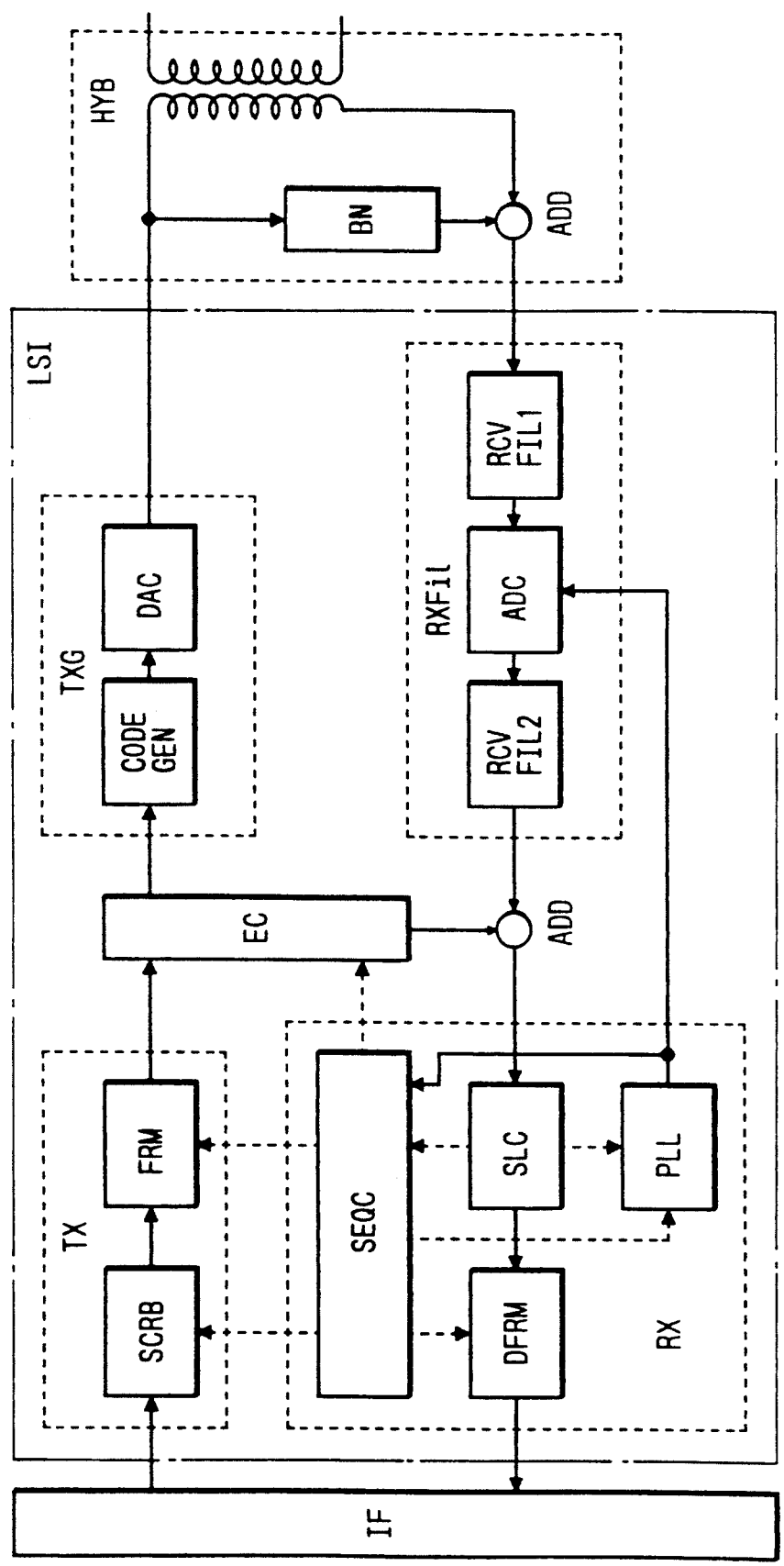
FIG. 2 is a block diagram showing an embodiment of an echo canceler system in a digital subscriber line.

FIG. 2 indicates a block diagram of an embodiment of the echo canceler system on a digital subscriber line. In FIG. 2, each circuit block of an LSI section enclosed by dash-and-dot line is formed on one semiconductor substrate such as single crystal silicon by well-known manufacturing technology for semiconductor integrated circuits.

The sending data being inputted through an interface IF are inputted to a sending section TX. The sending section TX is composed of a scriber SCRB and a frame constructing section FRM. The scriber SCRB transforms the sending data in serial and carries out scribe. The frame constructing circuit FRM assembles the scribe data to a frame.

The frame data being assembled by the sending section TX as mentioned above are sent to a sending data generating section TXG. The sending data generating section TXG is composed of a sending code generating circuit CODEGEN and a digital/analog conversion circuit DAC. The sending code generating circuit CODEGEN transforms the sending data into specified codes on the subscriber line SL. The sending data being transformed into such codes are outputted as analog signals by the digital/analog conversion circuit DAC.

The hybrid circuit HYB is composed of a BN circuit, a hybrid transformer and an adding circuit ADD. The BN circuit matches impedance viewed from the sending side, and attenuates circulating amounts of the analog signals towards communication systems.

Receiving data are fetched into a receiving data generating section RXFi1. The receiving data generating section RXFi1 is composed of a receiving filter RCVFIL1, an analog/digital conversion circuit ADC and a receiving filter RCVFIL2. The receiving filter RCVFIL1 carries out band limitation of receiving signals. The analog/digital conversion circuit ADC converts receiving signals into digital data, and the receiving filter RCVFIL2 carries out equalization of waveform.

A receiving section RX is composed of a determinator SLC, a PLL circuit, a frame resolving circuit DFRM and a sequence controller SEQC. The determinator SLC carries out identification of codes. The frame resolving circuit DFRM dissolves frames of data after the identification, and assembles the receiving data. The sequence controller SEQC controls conditions of the system.

The echo canceler EC generates pseudo echoes based on the sending data, and eliminates by offsetting echoes all of which cannot be deleted in the BN circuit with adding operation by the adding circuit ADD.

Figure 3:
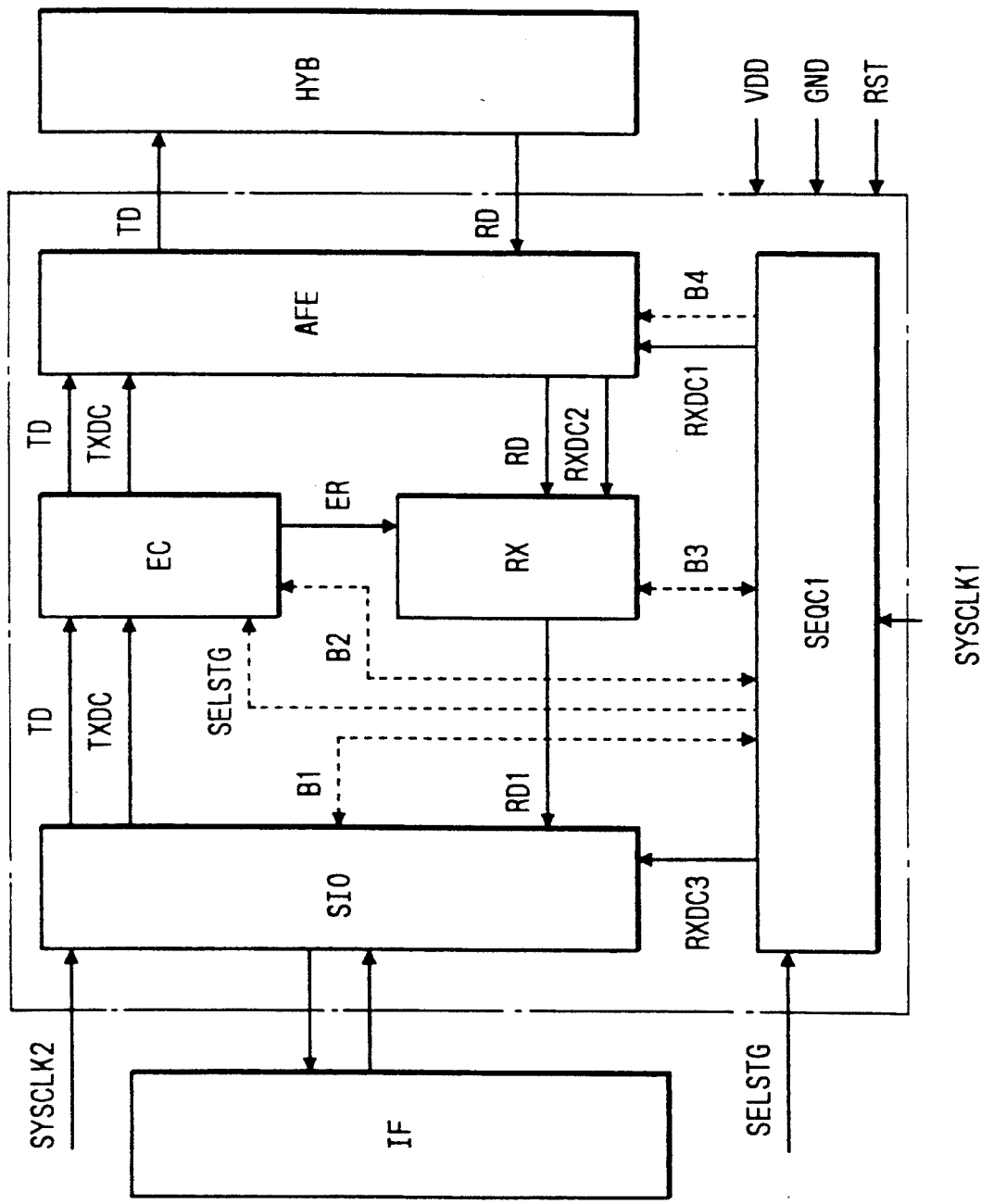
FIG. 3 is a block diagram showing an embodiment of an LSI section in the echo canceler system in the digital subscriber line in FIG. 2.

FIG. 3 indicates a block diagram of an echo canceler LSI including an echo canceler EC in the digital subscriber line in FIG. 2. FIG. 3 also illustrates principal timing signals and control signals.

A serial input/output circuit SIO executes functions of the scriber SCRB, the frame constructing circuit FRM and the frame resolving circuit DFRM in FIG. 2, and becomes an interface of the system.

The echo canceler EC is similar to that as above described. An analog section AFE executes functions of the sending code generating circuit CODEGEN, the digital/analog conversion circuit DAC, the receiving filter RCVFIL1 and the analog/digital conversion circuit in FIG. 2. A control section SEQC1 is nearly the same as the sequence controller SEQC, and serves to control the whole LSI.

A system clock SYSCLK1 is a basic clock to drive the LSI, and is supplied to the control section SEQC1. A system clock SYSCLK2 is a sending clock and an interface clock. A signal TD is sending data and is transmitted synchronizing with a sending clock TXDC through the serial input/output section SIO, the echo canceler EC and the analog section AFE, and is outputted to the hybrid circuit HYB, signal processing being carried out in respective stages. A signal RD is receiving data and is fetched into the receiving section RX, synchronizing with a receiving clock RXDC2. The signal RD being fetched into the echo canceler LSI is transmitted to an interface IF through the analog section AFE, the receiving section RX and the serial input/output section SIO, signal processing being carried out in respective stages. The receiving clock RXDC1 is a receiving data discriminating timing pulse, and the receiving clock RXDC2 is a receiving data transferring timing pulse. A signal RD1 is receiving data after the discrimination and is inputted to the serial input/output circuit SIO and subjected to frame dissolution by a receiving clock RXDC3.

A signal ER is a pseudo echo signal and is produced by the echo canceler EC. A signal B1 is a signal to control the serial input/output circuit SIO, and is synchronized with the receiving clock. A signal B2 is a signal to control the echo canceler EC, and is synchronized with the receiving clock. A signal B3 is a signal to control the receiving section RX, and is synchronized with the receiving clock. Further, a signal B4 is a signal to control the analog section AFE, and is synchronized with the receiving clock.

A signal SELSTG selects functions of a data buffer included in the echo canceler EC, and is used for switching control of the number of delay stages in the data buffer. VDD is the supply voltage for LSI, GND is the earth potential of the circuit, and RST is a reset signal, those being supplied to prescribed terminals (not shown) of the echo canceler LSI.

Figure 4:
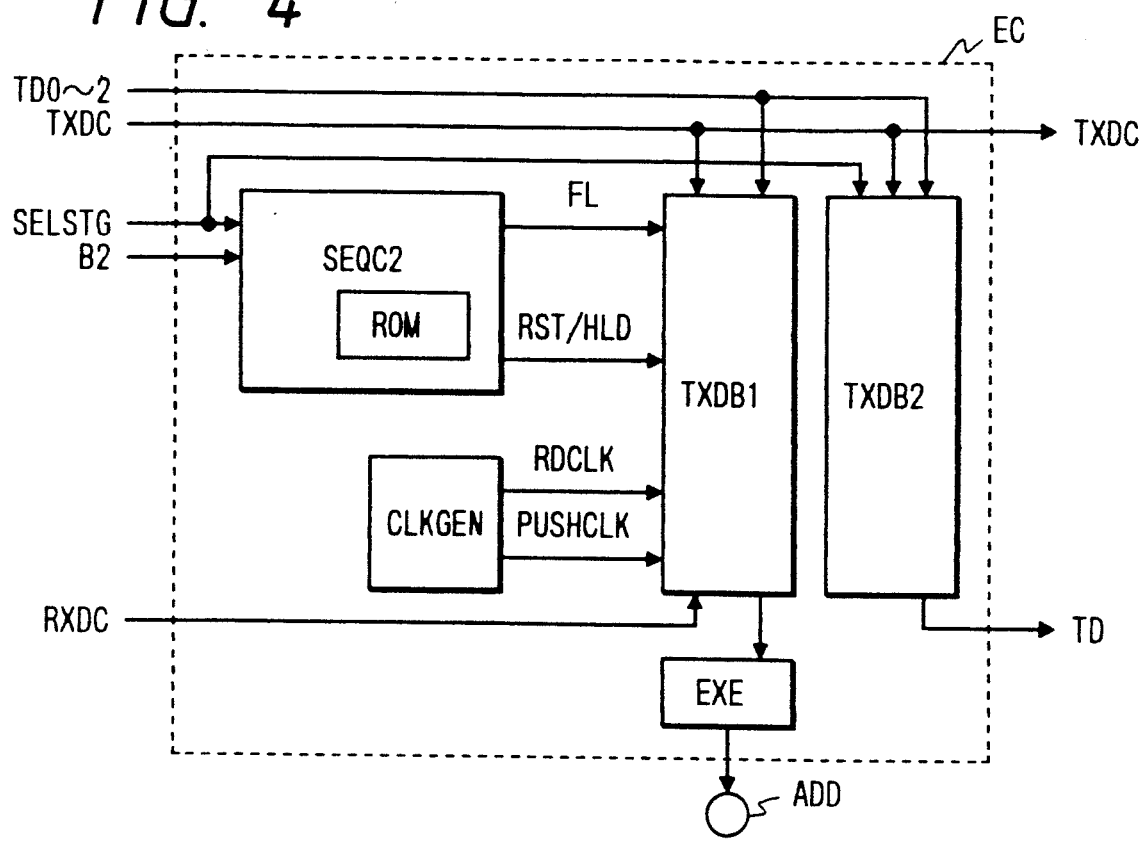
FIG. 4 is a block diagram showing an embodiment of the echo canceler EC.

FIG. 4 indicates a block diagram of an embodiment of the echo canceler EC. This embodiment is provided with two sending data buffers TXDB1 and TXDB2. One sending data buffer TXDB1 is used for timing adjustment to prevent missing of sending data and double fetching of the same data. The other sending data buffer TXDB2 acts as a delay circuit to secure the time corresponding to the timing adjustment, and is used to delay the sending data by a definite time.

A controller SEQC2 in the echo canceler EC receives a control signal B2 and a selecting signal SELSTG for the number of delay stages of the sending data buffer TXDB2, and produces control signals FL and RST/HLD of the sending data buffer TXDB1. A series of sequence control in the controller SECQ2 is processed according to programs being stored in a built-in program memory ROM (read only memory) with no special limitation. Signals TD0–TD2 are sending data. A signal TXDC is a sending clock, with which the sending of sending data TD is synchronized. A signal RXDC is a receiving clock which is used to take out pseudo echo. A clock generating circuit CLKGEN generates clocks RDCLK and PUSHCLK. The sending data buffer TXDB1 has function of first in-first out, and the write-in of sending data is carried out by a push clock PUSHCLK corresponding to the sending clock TXDC, and the read-out thereof is carried out by a read clock RDCLK corresponding to the receiving clock RXDC. Output signals of the sending buffer TXDB1 are sent to an operation execution section EXE, where prescribed operation processing is carried out and the processed signals are used as data for echo canceling.

When an echo canceler of this embodiment is installed in subscriber equipment such as telephone sets being connected by a subscriber line SL as shown in FIG. 1, a sending clock TXDC is produced based on a receiving clock RXDC. Therefore, it follows that the phase difference between the receiving clock RXDC and the sending clock TXDC is fixed. In such applications, if the number of delaying stages of sending data due to the sending data buffer TXDB1 being fetched into the echo canceler EC is less than the number of delaying stages for echo paths including the sending data buffer TXDB2, the echo canceler EC calculates the amount of echo about the sending data being not yet outputted into lines, resulting a bad effect that the amount of ineffective calculation has been increased in the training period. That is, as the tap length of the filter capable of being calculated in the training period is limited, a problem takes place in that if useless amount of calculation as mentioned above is increased, the tap length being effective for the training becomes shorter corresponding to the above increase and the echo canceling performance is reduced.

In this embodiment, adjusting of the amount of delay of the sending data buffer TXDB2 as delaying means, in other words, changing of the delay period takes place by the selecting signal SELSTG. According to this, the sending data being sent out actually can be outputted with the delay amount being decreased, and the delay amount of the sending data to be fetched in the echo canceler EC does not become significantly less than the number of delaying stages for echo paths, and ineffective amount of calculation during the training period can be kept to minimum. As a result, the tap length being effective for the training can be lengthened and the echo canceling performance can be maintained.

Figure 5:
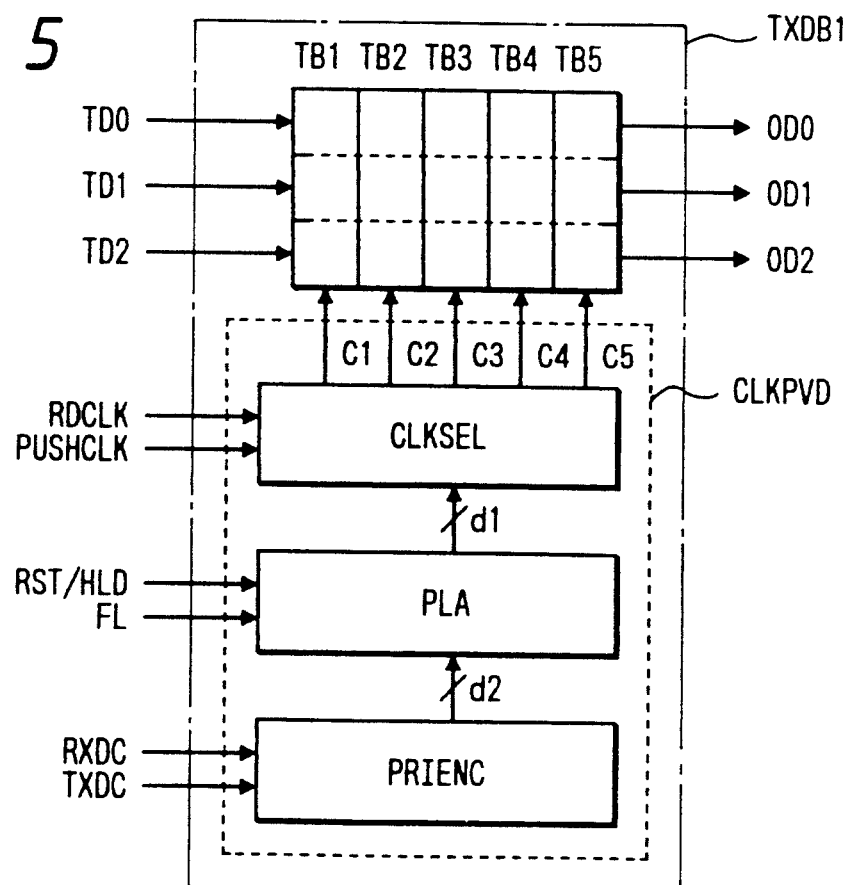
FIG. 5 is a block diagram showing an embodiment of the sending data buffer TXDB1.

FIG. 5 indicates a block diagram of an embodiment of the sending data buffer TXDB1 as mentioned above. The sending data buffer TXDB1 includes sending buffers TB1–TB5 and a clock pulse supply circuit CLKPVD for supplying the sending buffers TB1–TB5 with clock pulses selectively, and the clock pulse supply circuit CLKPVD has a clock selector CLKSEL, a condition control circuit PLA and a preference control circuit PRIENC.

Sending data TD0–TD2 being composed of 3 bits are transferred by the sending buffers TB1–TB5 operating as shift registers with five-stage flip-flop circuits connected in cascade form. The clock selector CLKSEL receives a read clock RDCLK making the sending buffers TB1–TB5 perform output operation (read-out operation) and a push clock PUSHCLK making them perform input operation (write-in operation), and generates clock pulses C1–C5 according to a clock selecting signal d1 being composed according to operation mode and storage contents.

The condition control circuit PLA is composed of programmable logic arrays, and produces a condition control signal which carries out, for example, selection control of clock pulses to be supplied to the sending buffers TB1–TB5. A signal RST/HLD and a signal FL are operation mode selecting signals, and combination of these signals indicates operation modes as in following table 1.

TABLE 1

| FL | RST/HLD | Operations |
|---|---|---|
| H | H | shift register operation being set to fixed number of delaying stages |
| H | L | shift register operation having the same number of delaying stages as the number of delaying stages immediately before switching signals FL, RST/HLD |
| L | H | FIFO register operation with fixed number of delaying stages being made the initial delay amount |
| L | L | FIFO register operation with the same number of delaying stages as the number of delaying stages immediately before switching signals FL, RST/HLD being made the initial delay amount |

Shift register operations being set to the fixed numbers of delaying stages are indicated mainly in the case when it is used in subscriber equipment such as telephone sets. The shift register operation having the same number of delaying stages as the number of delaying stages immediately before switching the signals FL, RST/HLD is in a mode where the condition control circuit FLA becomes a holding condition, and the condition being get by the training immediately before the present training is maintained. The FIFO register operation with the fixed number of delaying stages being made the initial delay amount is in an operation mode corresponding to the initial condition after the system resetting, and corresponds to the first condition of training. The FIFO register operation with the number of delaying stages immediately before switching the signals FL, RST/HLD being made the initial delay amount corresponds to the case where training is carried out from the condition holding. Thereby condition of training immediately before the present training is made available, and shortening of time required for the training is intended. Examples being set in Table 1 are assigned by the ROM (not shown) contained in the condition control circuit PLA.

The priority control circuit PRIENC gives the priority to either of the write-in (push) and the read-out (read) of the sending data buffer TXDB1 when both conflict with each other. In this embodiment, the read-out by the receiving clock RXDC has the priority and the write-in corresponding to the sending clock TXDC waits. The signal d2 is a control signal of the condition control circuit PLA.

Figure 6:
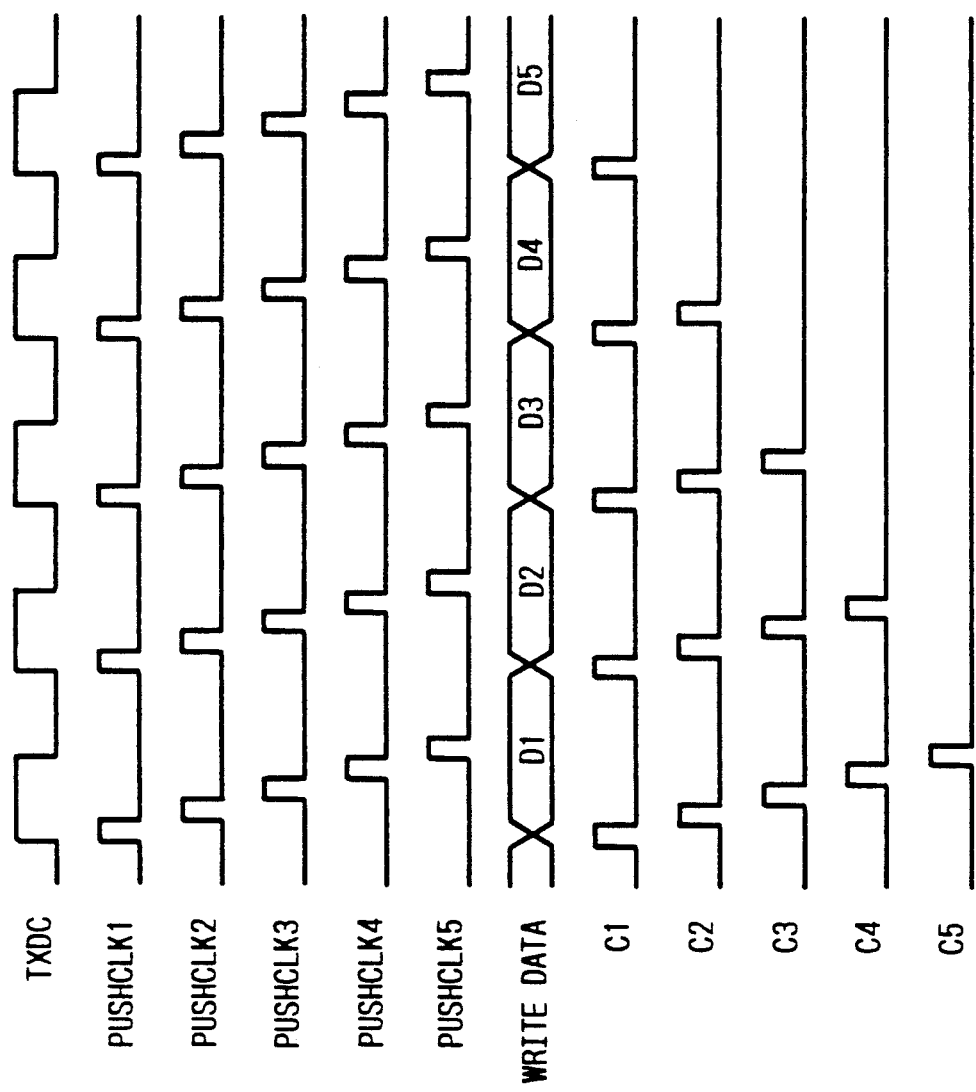
FIG. 6 is a timing chart explaining an example of write-in operation when the sending data buffer TXDB1 is used in FIFO mode.

FIG. 6 indicates a timing chart for explaining one example of write-in operation when the sending data buffer TXDB1 used in FIFO register operation.

When a sending clock pulse TXDC is detected, push clocks PUSHCLK1–PUSHCLK5 are produced in sequence. Under the conditions that sending buffers TB1–TB5 are vacant, clocks C1–C5 are produced and the first same data D1 composed of 3 bits are written into all sending buffers TB1–TB5. That is, the data D1 being synchronized with the clock pulses C1–C5 and fetched into the sending buffer TB1 of the first stage are shifted in sequence and the same data D1 are stored up to the sending buffer TB5 of the last stage.

When the second sending clock pulse TXDC is detected, push clocks PUSHCLK1–PUSHCLK5 are generated in sequence. Under the condition that effective data are stored in the sending buffer TB5 of the last stage among sending buffers TB1–TB5, the clocks C1–C4 except for the clock C5 are produced and the second same data D2 composed of 3 bits are written into the sending buffers TB1–TB4. That is, the data D2 being synchronized with the clock pulses C1–C4 and fetched into the sending buffer TB1 of the first stage are shifted in sequence and stored up to the sending buffer TB4.

When the third sending clock pulse TXDC is detected, push clocks PUSHCLK1–PUSKCLK5 are produced in sequence. Under the condition that effective data are stored in the sending buffers TB5 and TB4 corresponding to the two effective data D1 and D2 among the sending buffers TB1–TB5, the clocks C1–C3 except for the clocks C5 and C4 are produced and the third same data D3 composed of 3 bits are written into the sending buffers TB1–TB3. That is, the data D3 being synchronized with the clock pulses C1–C3 and fetched into the sending buffer TB1 of the first stage are shifted in sequence and stored up to the sending buffer TB3.

When the fourth sending clock pulse TXDC is detected, push clocks PUSHCLK1–PUSHCLK5 are produced in sequence. Under the condition that effective data are stored in the sending buffers TB5–TB3 corresponding to the three effective data D1–D3 among the sending buffers TB1–TB5, the clocks C1 and C2 except for the clocks C5–C3 are produced and the fourth same data D4 composed of 3 bits are written into the sending buffers TB1 and TB2. That is, the data D4 being synchronized with the clock pulses C1 and C2 and fetched into the sending buffer TB1 of the first stage are shifted and stored up to the sending buffer TB2.

When the fifth sending clock pulse TXDC is detected, push clocks PUSHCLK1–PUSHCLK5 are produced in sequence. Under the condition that effective data are stored in the sending buffers TB5–TB2 corresponding to the four effective data D1–D4 among the sending buffers TB1–TB5, only the clock C1 except for the clocks C5–C2 is produced and the fifth data composed of 3 bits are written into the sending buffer TB1.

Figure 7:
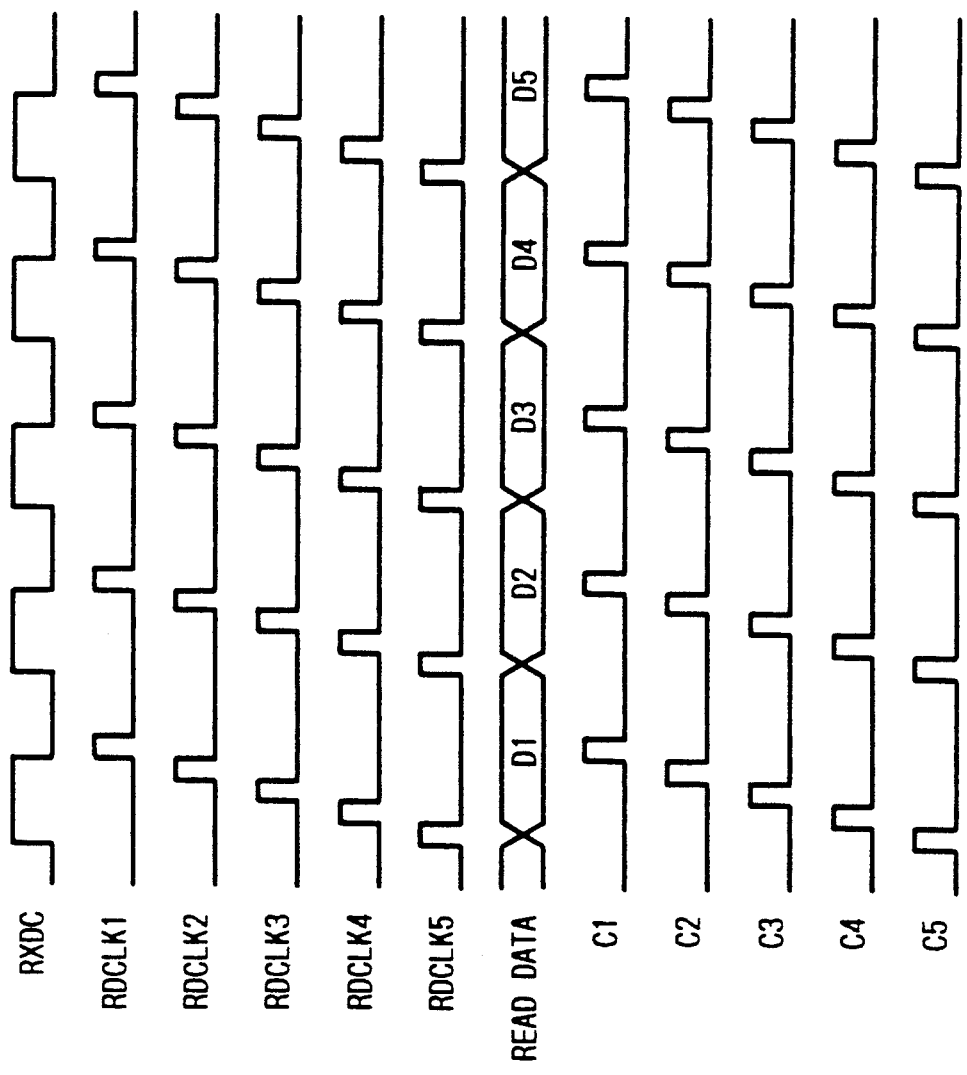
FIG. 7 is a timing chart explaining an example of read-out operation when the sending data buffer TXDB1 is used in FIFO mode.

FIG. 7 indicates a timing chart for explaining one example of the read-out operation when the sending data buffer TXDB1 is used in the FIFO register operation.

When the receiving clock pulse RXDC is detected, read clocks RDCLK1–RDCLK5 are produced in sequence. Read mode carries out a shift register operation only. For example, when data D1–D5 are stored in the sending buffers TB1–TB5 as described above, clocks C5–C1 are produced in sequence corresponding to the read clocks RDCLK1–RDCLK5. That is, after the data D1 of the sending buffer TB5 are outputted as read data, the data D2 of the sending buffer TB4 are transferred to the sending buffer TB5 by the clock C5.

In similar manner, after the data D2 of the sending buffer TB4 are transferred to the sending buffer TB5, the data D3 of the sending buffer TB3 are transferred to the sending buffer TB4 by the clock C4. After the data D3 of the sending buffer TB3 are transferred to the sending buffer TB4, the data D4 of the sending buffer TB2 are transferred to the sending buffer TB3 by the clock C3. Further, after the data D4 of the sending buffer TB2 are transferred to the sending buffer TB3, the data D5 of the sending buffer TB1 are transferred to the sending buffer TB2 by the clock C2. Thus, when the first receiving clock pulse RXDC is detected, the shift register operation of 1 bit takes place, and the data D2 to be outputted next are stored in the sending buffer TB5 of the last stage. The data D5 remain intact as invalid data in the sending buffer TB1 of the first stage.

When the second receiving clock pulse RXDC is detected, read clocks RDCLK1-RDCLK5 are produced in sequence. In similar manner, clocks C5-C1 are produced in sequence corresponding to the read clocks RDCLK1-RDCLK5, and after the data D2 of the sending buffer TB5 are outputted as read data, the data D3 of the sending buffer TB4 are transferred to the sending buffer TB5 by the clock C5.

In similar manner, after the data D3 of the sending buffer TB4 are transferred to the sending buffer TB5, the data D4 of the sending buffer TB3 are transferred to the sending buffer TB4 by the clock C4. After the data D4 of the sending buffer TB3 are transferred to the sending buffer TB4, the data D5 of the sending buffer TB2 are transferred to the sending buffer TB3 by the clock C3. Further, after the data D5 of the sending buffer TB2 are transferred to the sending buffer TB3, the invalid data D5 of the sending buffer TB1 are transferred to the sending buffer TB2 by the clock C2. When the second receiving clock pulse RXDC is detected, the shift register operation of 1 bit takes place again and the data D3 to be outputted next are stored in the sending buffer TB5 of the last stage.

Figure 9A:
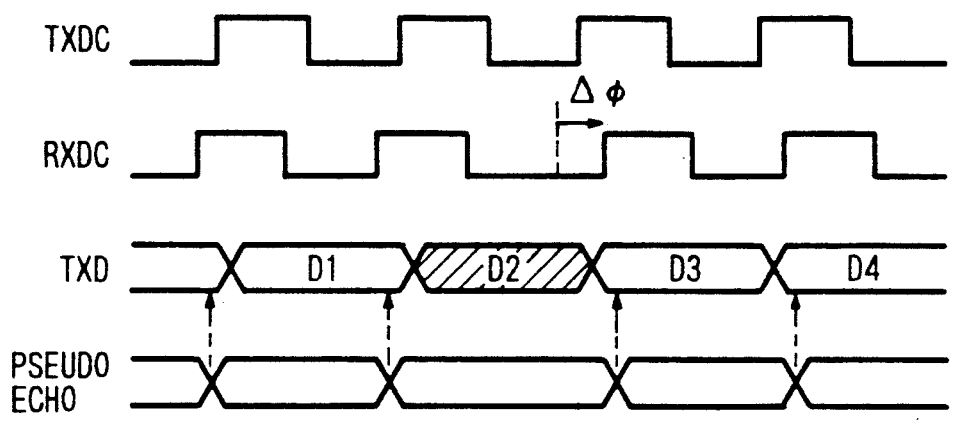
FIGS. 9(A) and 9(B) are timing charts explaining missing and double fetching of data at the sending/receiving training.
Figure 9B:
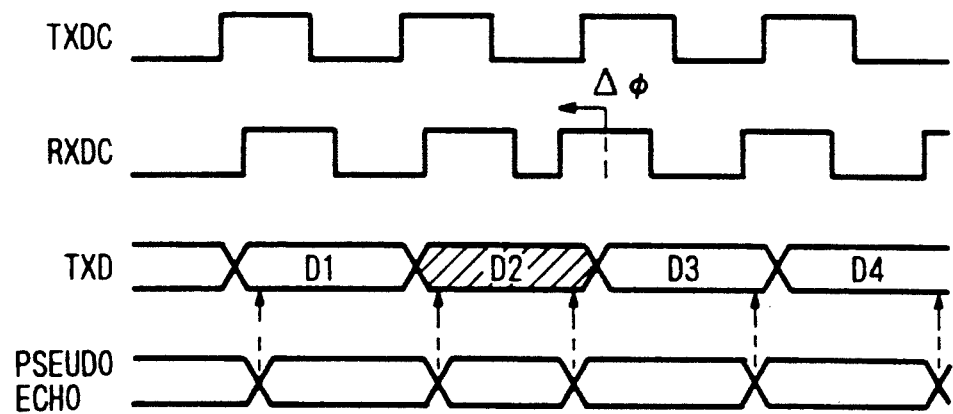

By the receiving clock pulse RXDC as mentioned above, the shift register operation of 1 bit takes place, and the read-out operation of the five data (D1-D5) is carried out. Then, whenever the shift operation of 1 bit as mentioned above takes place, before the effective data, the same data as that inputted last are kept as invalid data formally. In the condition control circuit PLA, effective data being held in the sending buffers TB1-TB5 are recognized by counting the sending clock pulse TXDC and the receiving clock pulse RXDC as described above, and the clock selecting signal d1 as mentioned above being produced according to the operation mode, the sending buffers TB1-TB5 operate as a FIFO register. Further, the shift operation of 1 bit equivalent to the read-out operation as mentioned above is carried out in the shift register mode as hereinafter described. FIGS. 9(A) and 9(B) indicate timing charts for explaining data missing and data double fetching in the sending/receiving training respectively.

Data missing in FIG. 9(A) is liable to occur in the case that when back edge (fall edge) of the sending data TXD has little margin with respect to rise edge of the receiving clock RXDC, phase of the receiving clock pulse RXDC is lagged by $\Delta\phi$ to the sending clock pulse TXDC according to the results of the training processing. That is, as a result of lagging the receiving clock pulse RXDC by $\Delta\phi$ by the phase control as mentioned above, missing of the data D2 occurs thereby the receiving data being fetched are not coincident with expected values and the training is started again from the beginning.

Double fetching of data in FIG. 9(B) is liable to occur in the case that when front edge (rise edge) of the sending data TXD has little margin with respect to fall edge of the receiving clock RXDC, phase of the receiving clock pulse RXDC is led by $\Delta\phi$ to the sending clock pulse TXDC according to the results of the training processing. That is, as a result of leading the receiving clock pulse RXDC by $\Delta\phi$ by the phase control as mentioned above, double fetching of the data D2 occurs thereby the receiving data being fetched are not coincident with expected values and the training is started again from the beginning.

Figure 8:
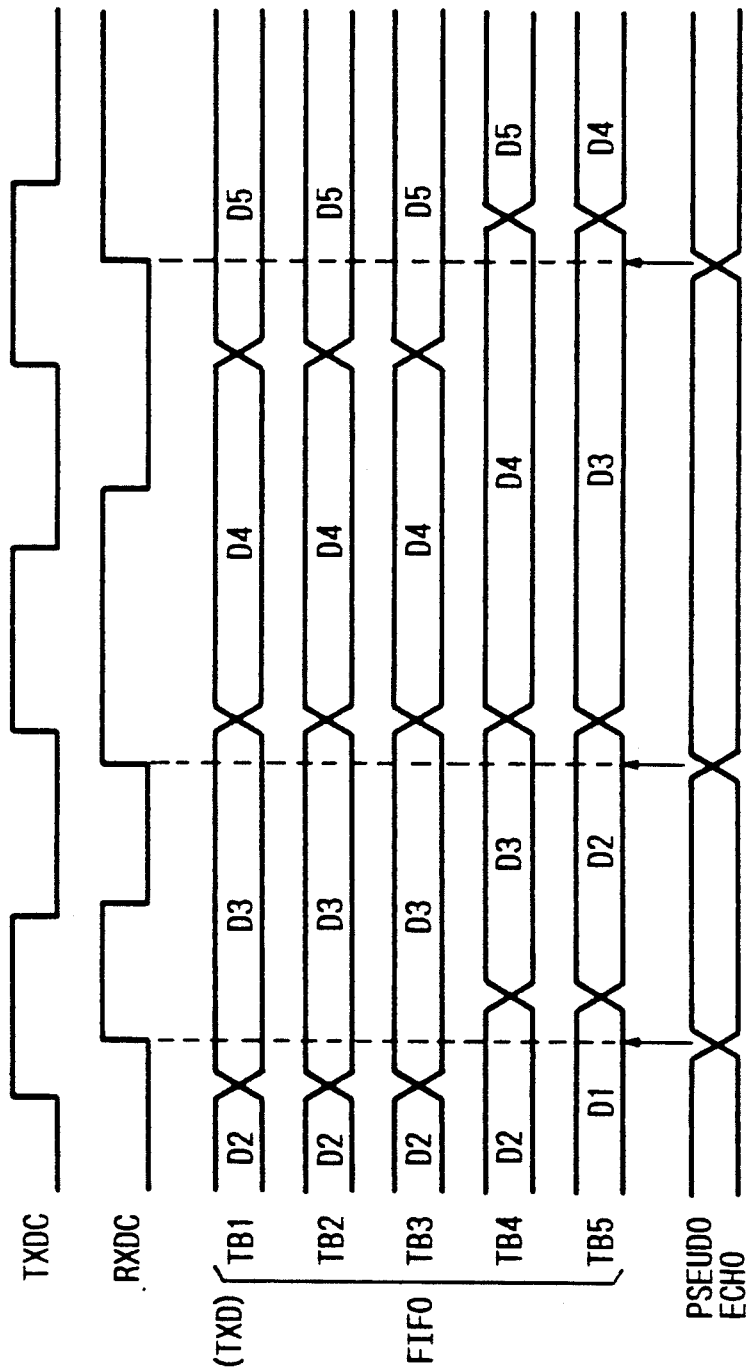
FIG. 8 is an operation timing chart showing an embodiment when the sending data buffer TXDB1 is used in FIFO mode.

FIG. 8 indicates an operation timing chart of an embodiment when the sending data buffer TXDB1 is used in the FIFO register mode.

In the state that the effective data D1 and D2 are stored in the sending buffers TB1-TB5, if the sending clock pulse TXDC is detected, the data D3 are written up to the sending buffer TB3 in the empty condition. If the receiving clock pulse RXDC is detected, the data D1 in the sending buffer TB5 of the last stage are outputted and then the shift register operation of 1 bit is carried out, thereby the data D2 are stored in the sending buffer TB5 and the data D3 are stored in the sending buffers TB4-TB1.

Even if phase of the receiving clock pulse RXDC is led by the phase control, the data D2 being stored in the sending buffer TB5 synchronizing with the phase are outputted. Subsequently the shift register operation of 1 bit is carried out, and the data D3 are stored in the sending buffer TB5 of the last stage. As empty conditions continue up to the sending buffer TB4 in this state, if the sending clock pulse TXDC is detected, the data D4 are written up to the sending buffer TB4 in the empty condition by the shift operation. If the sending clock pulse TXDC is detected again as a result of lagging phase of the receiving clock pulse RXDC by the phase control, the data D3 in the sending buffer TB5 of the last stage are outputted and then the shift register operation of 1 bit is carried out, thereby the data D4 are stored in the sending buffer TB5 and the data D5 are stored in the sending buffers TB4-TB1.

Even if phase of the clock pulse RXDC is greatly changed with respect to the sending clock pulse TXDC by such phase control operation, without being affected by such great change, the transferred data D1-D5 being written synchronizing with the sending clock pulse TXDC are sent synchronizing with the receiving clock RXDC, and missing or double fetching of data as above described does not take place, thereby the sending data can be supplied to produce pseudo echoes securely.

Figure 10:
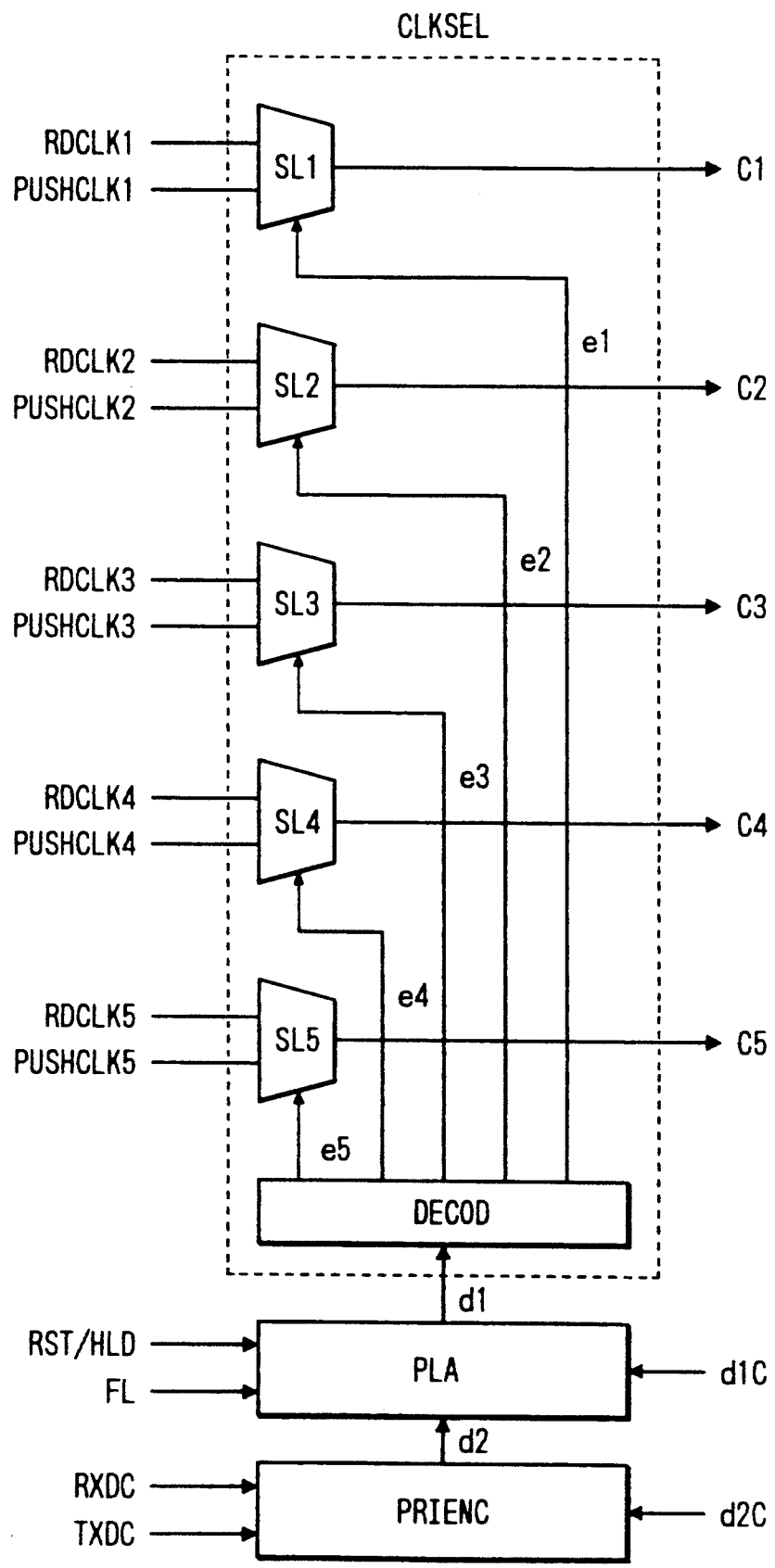
FIG. 10 is a detailed block diagram showing an embodiment of a clock selector CLKSEL.

FIG. 10 indicates a detailed block diagram of an embodiment of the clock selector CLKSEL.

The clock selector CLKSEL is composed of selecting circuits SL1-SL5 corresponding to read clocks RDCLK1-RDCLK5 and push clocks PUSHCLK1-PUSHCLK5, and a decoder circuit DECOD forming selecting signals e1-e5 for the circuits SL1-SL5. The decoder circuit DECOD decodes a clock selecting signal d1 being supplied from the condition control circuit PLA, and generates the selecting signals e1-e5 to generate clocks C1-C5 corresponding to the shift register mode, the FIFO register mode and the write/read operation. According to the above, for example, clocks C1-C5 as shown in FIG. 6 and FIG. 7 are outputted.

Figure 11:
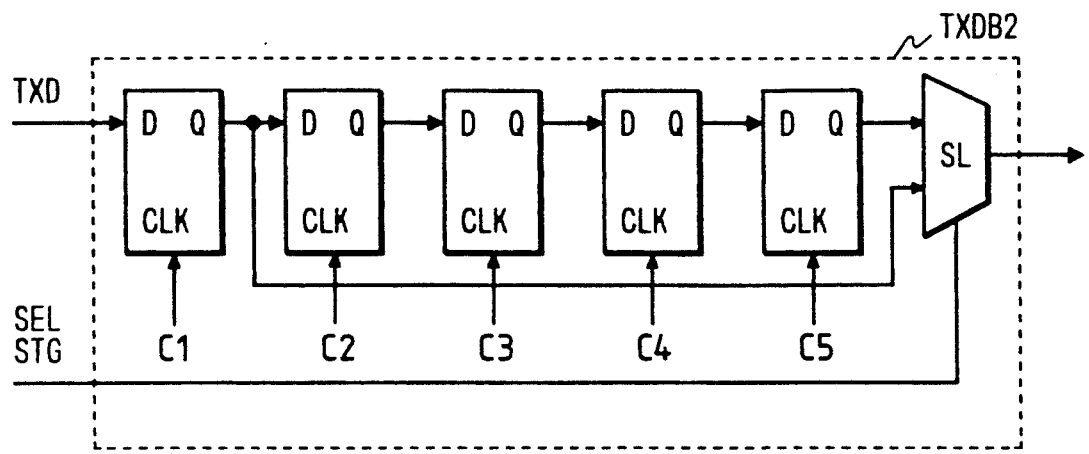
FIG. 11 is a block diagram showing an embodiment of the sending buffer TXDB2 as a delay circuit.

FIG. 11 indicates a block diagram of an embodiment of the sending buffer TXDB2 as a delay circuit. A primary role of the sending buffer TXDB2 is to delay the sending data TXD responsive to the FIFO register mode of the sending buffer TXDB1 as mentioned above. Therefore, flip-flops are connected in cascade form and made the shift register constitution similar to the above description, and the delay time for the number of stages of the flip-flops is secured.

In the case that the circuit of the embodiment is installed in subscriber equipment such as telephone sets as above described, however, when the sending clock TXDC is formed based on the receiving clock RXDC, the phase difference between the receiving clock RXDC and the sending clock TXDC is fixed. In such application, if the number of delay stages of sending data due to the sending data buffer TXDB1 being fetched in the echo canceler EC is less than the number of delay stages for echo path including the sending data buffer TXDB2, the echo canceler EC calculates the echo amount about the sending data being not yet outputted to lines, thereby a problem occurs in that invalid operation quantity is increased during the training period.

Therefore, functions of controlling the selector SL being installed in the output section and outputting the output of the first stage circuit directly are provided by the selecting signals SELSTG. In this case, as the delay amount of sending data being actually sent can be reduced considering the delay time due to the echo canceler EC or the like, the delay amount of the sending data being fetched into the echo canceler EC can be made approximately coincident with the number of delay stages of echo path, and the invalid operation quantity during the training period can be kept to minimum. As a result, the tap length being effective for the training can be lengthened and the echo cancel performance can be maintained.

Figure 12:
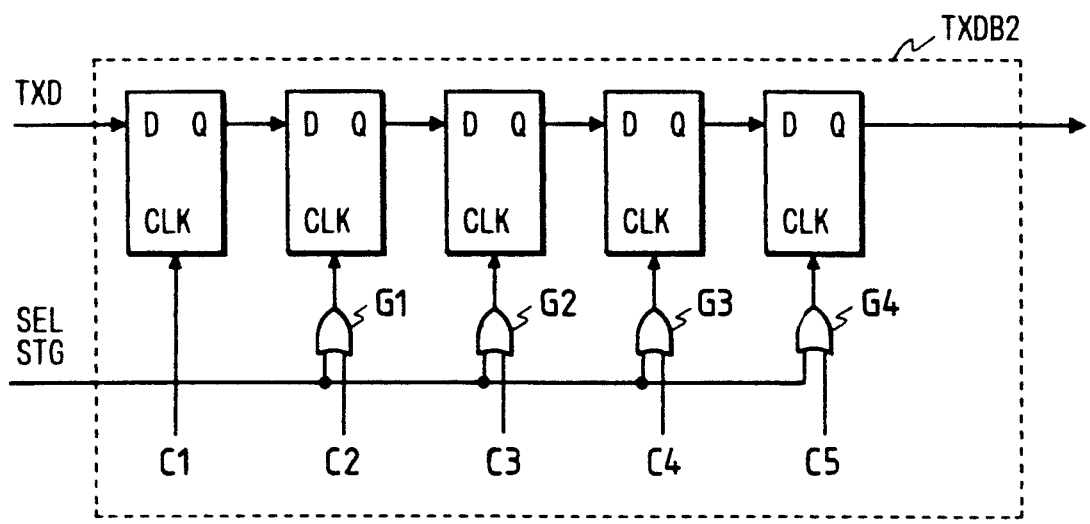
FIG. 12 is a block diagram showing another embodiment of the sending buffer TXDB2 as a delay circuit.

FIG. 12 indicates a block diagram of another embodiment of the sending buffer TXDB2 as a delay circuit. In this embodiment, clocks C2-C5 or a selecting signal SELSTG are supplied by OR gate circuits G1-G4 as clocks to be supplied to clock terminals CLK of flip-flops excluding the first stage circuit. For example, when a selecting signal SELSTG is on low level (logic 0), the shift operation being synchronized with the clocks C2-C5 is carried out, and when a selecting signal SELSTG is on high level (logic 1), output Q of the first stage flip flop is outputted directly. That is, the sending data TXD are outputted with the delay time according to the flip-flop of one stage.

Figure 13:
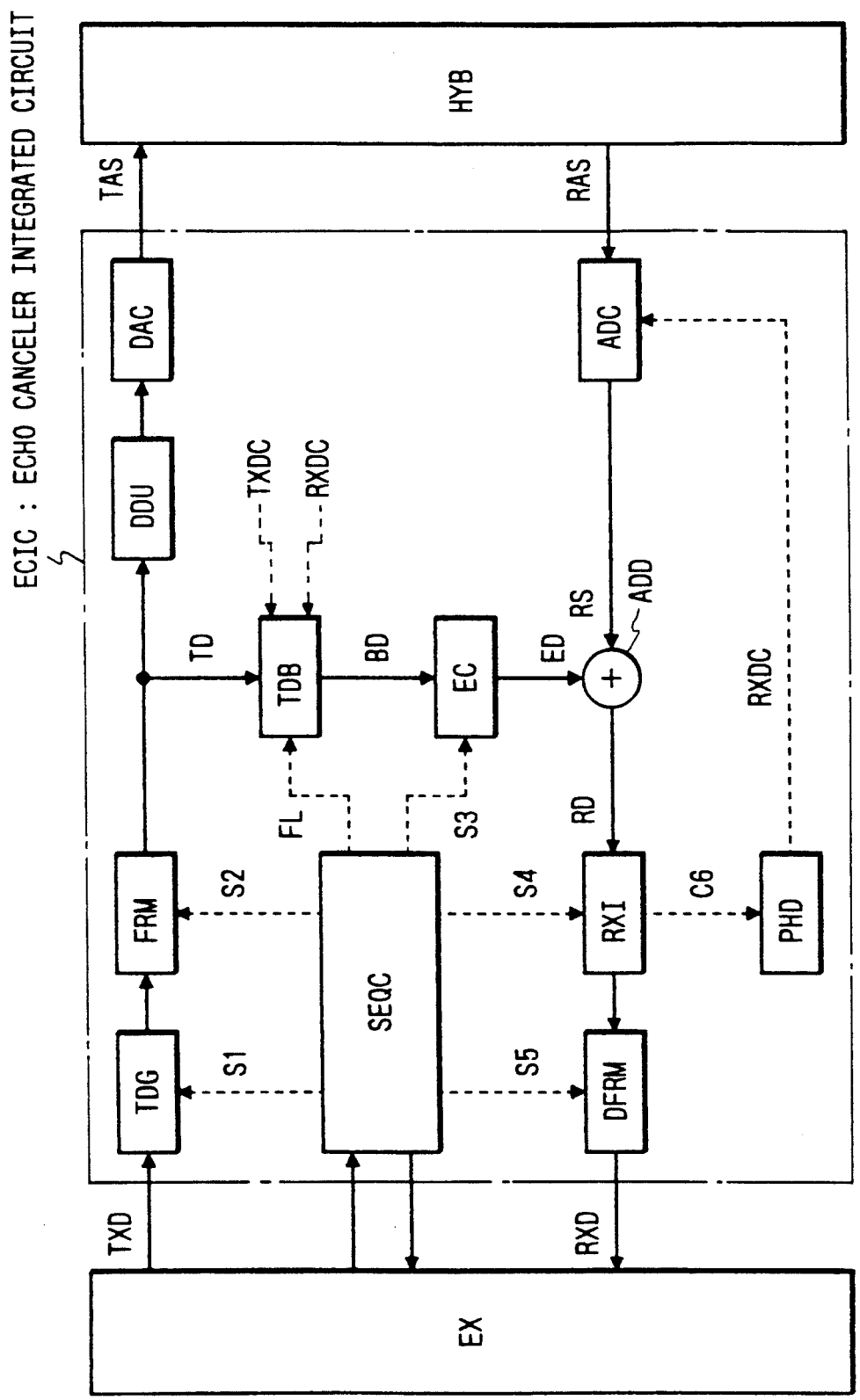
FIG. 13 is a block diagram showing an embodiment of an echo canceler integrated circuit to which the invention is applied.

In FIG. 13, an echo canceler integrated circuit ECIC, with no special limitation, is included in a subscriber line circuit of the integrated service digital network and is installed between an exchanger EX and a hybrid circuit HYB. The echo canceler integrated circuit ECIC is supplied with digital sending data TXD from the exchanger EX and with analog receiving signals RAS from the hybrid circuit HYB. Output signals of the sending section of the echo canceler integrated circuit ECIC are supplied as analog sending signals TAS to the hybrid circuit HYB, and output signals of the receiving section are supplied as digital receiving data RXD to the exchanger EX. Further, the echo canceler integrated circuit ECIC sends and receives plural control signals between it and the exchanger EX.

Digital sending data being supplied from the exchanger Ex are converted to a serial data line by a sending data generating section TDG of the echo canceler integrated circuit ECIC, and are further established to a frame suitable for a prescribed signal form by the frame assembling section FRM. In this embodiment, sending data TD being outputted from the frame assembling section FRM are made so-called multi-value codes, and 1 data of them is expressed by a digital signal of 3 bits. The sending data generating section TDG and the frame assembling section FRM are supplied with control signals S1 and S2 from a sequence control section SEQC integrating operations of each section of the echo canceler integrated circuit respectively.

Output signals of the frame assembling section FRM, that is, sending data TD pass through a data delaying section DDU and a digital/analog conversion section DAC and are converted to prescribed analog sending signals TAS, and then are sent through a hybrid circuit HYB to a subscriber line SL and are also supplied to a sending data buffer TDB. The sending data buffer TDB is supplied with a control signal FL from the sequence control section SEQC, and further with a sending clock signal TXDC and a receiving clock signal RXDC. The sending data buffer TDB fetches the sending data TD and stores it according to the sending clock signal TXDC, as mentioned below. These sending data TD are read from the sending data buffer TDB according to the receiving clock signal RXDC, and are supplied as buffer data BD to the echo canceler section EC.

The echo canceler section EC acts according to control signals S3 supplied from the sequence control section SEQC, and produces the prescribed echo data ED based on the buffer data BD and supplies it to one input terminal of the adder ADD. The other input terminal of the adder ADD is supplied with output signals of the analog/digital conversion section ADC, that is, digital receiving signals RS being produced based on the analog receiving signals RAS from the subscriber line SL through the hybrid circuit HYB. The adder ADD eliminates noise component equivalent to the echo data ED from digital receiving signals RS, and extracts the receiving data RD and supplies them to a receiving data discriminating section RXI. The receiving data RD are discriminated and restored by the receiving data discriminating section RXI, and clock signal C6 is extracted based on these receiving data. The clock signal C6 is transmitted to a phase detecting section PHD, and a receiving clock signal RXDC having the optimum phase is produced based on the clock signal C6. Output signals of the receiving data discriminating section RXI pass through a frame resolving section DFRM and become parallel receiving data RXD and are transmitted to the exchanger EX.

Figure 14:
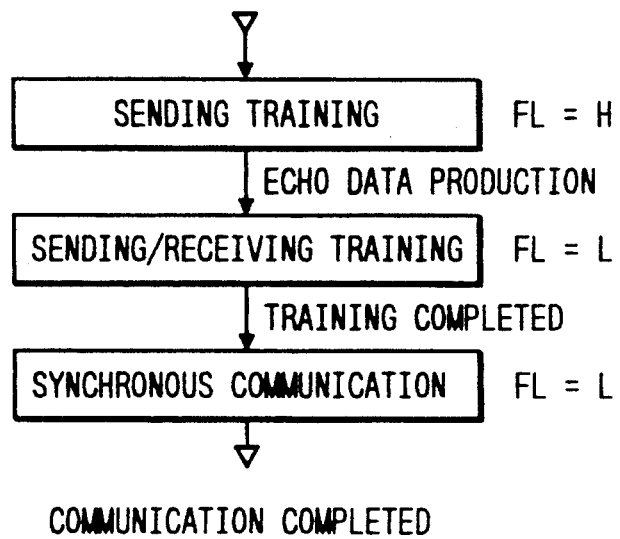
FIG. 14 is a diagram of processing flow for explaining communication procedure of subscriber line equipment including the echo canceler integrated circuit in FIG. 13.

In this embodiment, the algorithm of producing the echo data ED by the echo canceler section EC is learned in the training mode being carried out before the data transmission, and is stored in multipliers MX1-MX4 being described below of the echo canceler section EC. That is, in a subscriber line circuit of this embodiment, as shown in FIG. 14, when communication is started, at first, the sending training mode is carried out with the sending from the receiving station being stopped, and the echo data ED corresponding to each logic level of the sending data TD are produced. Then operation of the phase detecting section PHD is stopped, and phase of the receiving clock signal RXDC supplied to the sending data buffer TDB is fixed to a prescribed value. When production of the echo data ED is finished, data are transmitted from both the sending station and the receiving station and the sending-/receiving training is carried out, thereby the optimum phase of the receiving clock signal RXDC is estimated. Then, the phase detecting section PHD is made the operation condition, and the phase of the receiving clock signal RXDC is controlled so that the discriminating point of the receiving data due to the receiving data discriminating section RXI becomes the optimum phase. Accordingly, the phase of the receiving clock signal RXDC is changed according to the prescribed algorithm, and settled to the optimum phase soon. When these trainings are completed, subscriber line circuits of the sending station and the receiving station become synchronous communication condition, and sending and receiving for a series of communication data are started.

Figure 15:
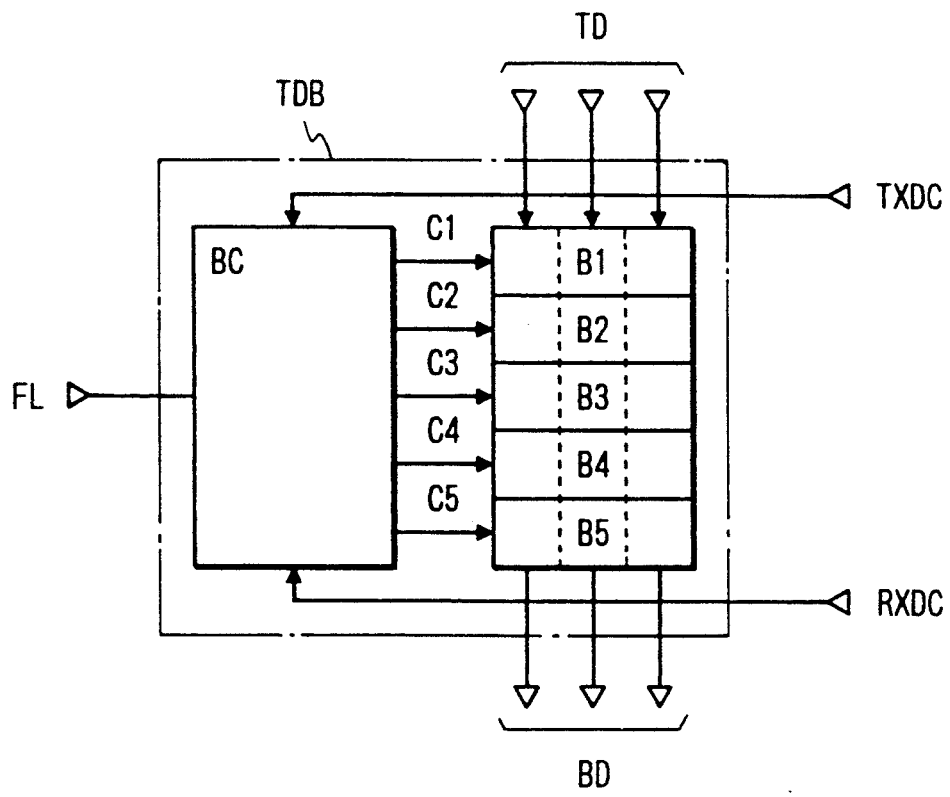
FIG. 15 is a block diagram showing an embodiment of a sending data buffer included in the echo canceler integrated circuit in FIG. 13.

Here, the sending data buffer TDB includes five data buffers B1-B5 being installed in series condition, and a buffer control section BC controlling these data buffers as shown in FIG. 15, with no special limitation. Among them, the data buffers B1-B5 are composed of flip-flops having 3 bits respectively, and corresponding clock signals C1-C5 are supplied from the buffer control section BC respectively. Further, the buffer control section BC is supplied with the control signal FL from the sequence control section SEQC, and with the sending clock signal TXDC and the receiving clock signal RXDC. In this embodiment, the control signal FL is made high level H when the subscriber line circuit is made the sending training mode, that is, when the phase of the receiving clock signal RXDC is fixed, and it is made low level when the subscriber line circuit is made the sending/receiving training mode, that is, when the phase of the receiving clock signal RXDC is changed towards the optimum phase.

When the subscriber line circuit is made the sending training mode and the control signal FL is made high level, the data buffers B1-B5 constituting the sending data buffer TDB are made so-called shift register mode. Then, the buffer control section BC first makes the clock signals C5 and C4 high levels in sequence according to the sending clock signal TXDC as shown in FIG. 16, and subsequently makes the clock signals C1, C2 and C3 high levels in sequence. Therefore, after the sending data been held by the data buffers B4 and B3 are shifted in sequence to the data buffers B5 and B4, the sending data TD being inputted newly are transmitted through the data buffers B1 and B2 to the data buffer B3. Needless to say, the sending data been held by the data buffer B5 just before then are transmitted to the echo canceler section EC and used for the echo extraction processing, and are cleared when next sending data are shifted from the data buffer B4. That is, in the sending training mode, only the write-in operation into the sending data buffer TDB is carried out and three sending data are always stored in the data buffers B3-B5, and two data buffers B1 and B2 are made empty condition, preparing for the subsequent FIFO register mode.

Next, when the subscriber line circuit is made the sending/receiving training mode and the control signal FL is made low level, the data buffers B1-B5 constituting the sending data buffer TDB are made so-called FIFO register mode. Then the buffer control section BC makes, for example, the clock signals C1 and C2 higher level in sequence according to the sending clock signal TXDC, and makes, for example, the clock signals C5, C4 and C3 higher level in sequence according to the receiving clock signal RXDC, as shown in FIG. 16. Therefore, the sending data TD being newly inputted are written into the data buffer B2 in empty condition through the data buffer B1. Further, the sending data being held by the data buffer B5 are read out at the echo canceler section EC, and the sending data being held by the data buffers B2, B3 and B4 are shifted in sequence to the data buffers B3, B4 and B5, and the data buffer B2 is made empty condition again. That is, in the sending/receiving training mode, the sending data stored in the first data buffer being not in empty condition are read out in the echo canceler section EC in sequence according to the receiving clock signal RXDC, and the sending data TD being newly inputted are written in sequence into the first data buffer being in empty condition according to the sending clock signal TXDC, thereby so-called first in first out register mode can be realized.

Based on the above, in the sending/receiving training mode of the echo canceler integrated circuit ECIC of this embodiment, even if the phase of the sending clock signal TXDC becomes leading greatly with respect to the receiving clock signal RXDC, the sending data TD can be transmitted without overlapping to the echo canceler, and contrarily even if the phase of the sending clock signal TXDC becomes lagging greatly with respect to the receiving clock signal RXDC, the sending data TD can be transmitted without missing to the echo canceler section EC. In any of the cases, however, the echo canceler section EC can complete the normal phase converging processing in a relatively short time. As a result, the required time for the training of the subscriber line circuit can be shortened and the overtime can be prevented.

Further, the sending data buffer TDB of this embodiment stores the holding condition of the data buffers B1-B5 at the time of completion of communication, that is, the phase relation between the sending clock signal TXDC and the receiving clock signal RXDC, even after ending the synchronous communication. When next communication is started in a prescribed period, such information is supplied for the sending training mode and the sending/receiving training mode, thereby the required time for the training mode of the subscriber line circuit can be more reduced.

Figure 17:
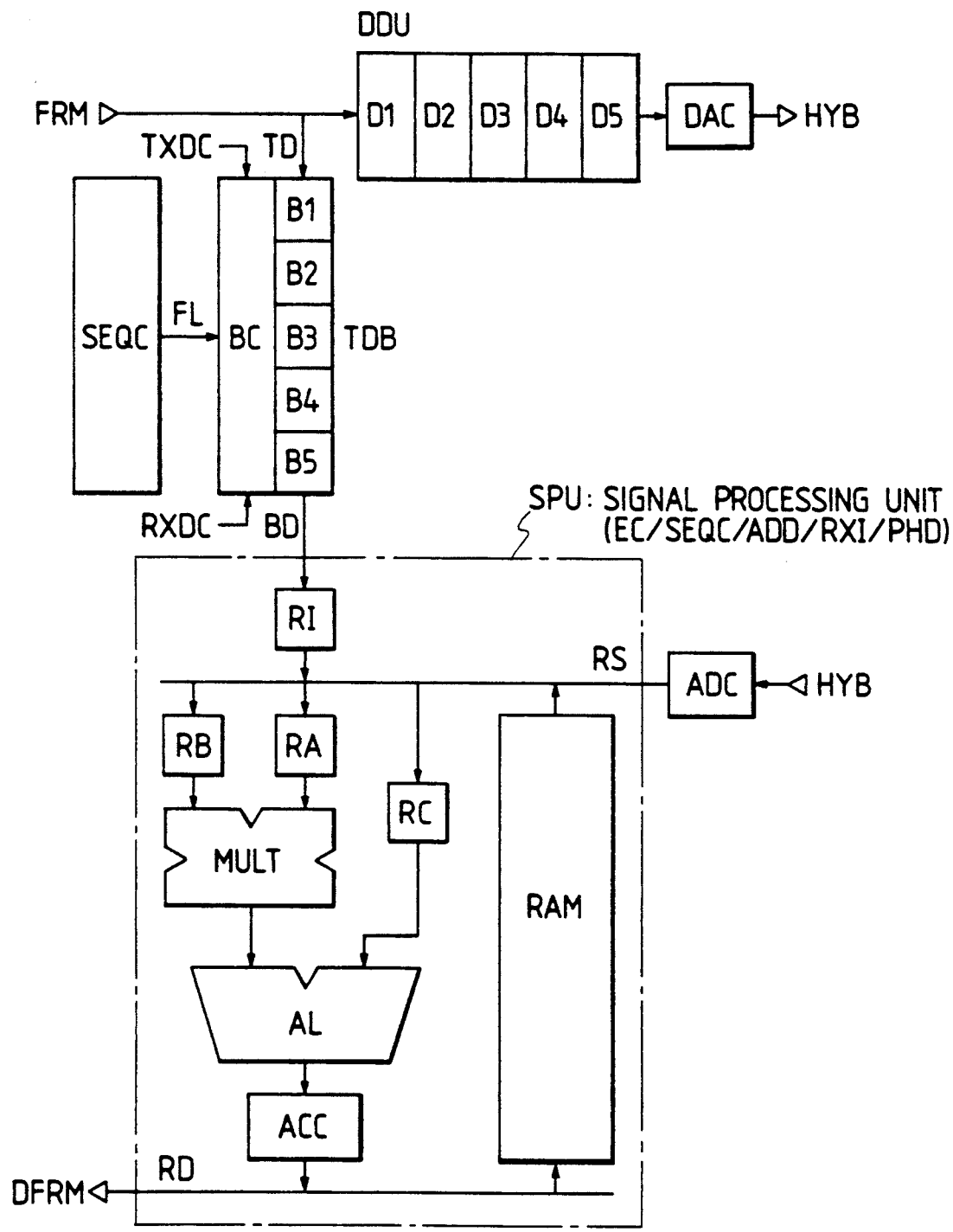
FIG. 17 is a block diagram showing an embodiment of an echo canceler section included in the echo canceler integrated circuit in FIG. 13.
Figure 18:
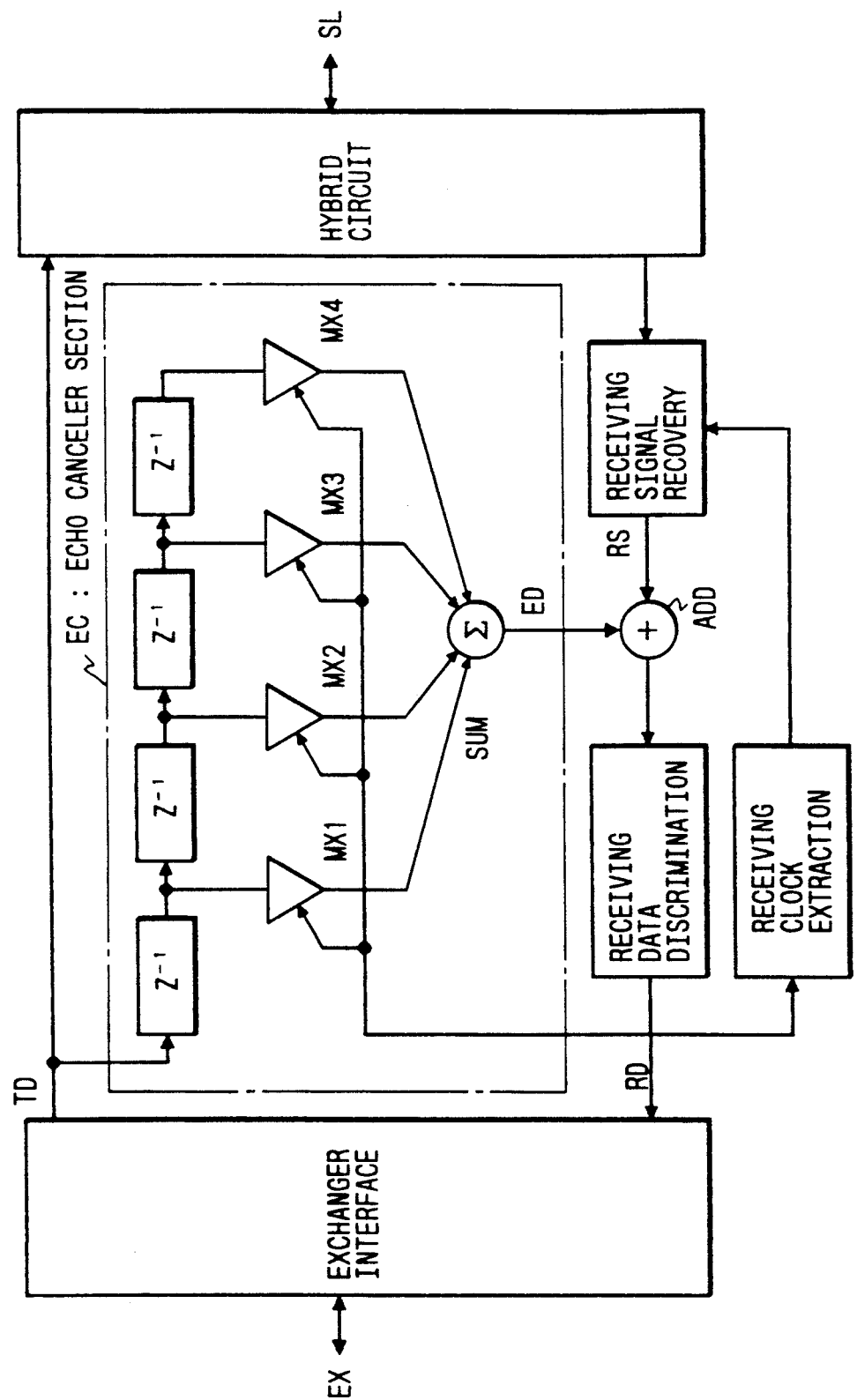
FIG. 18 is a concept diagram explaining functions of the echo canceler section in FIG. 17.
Figure 19:
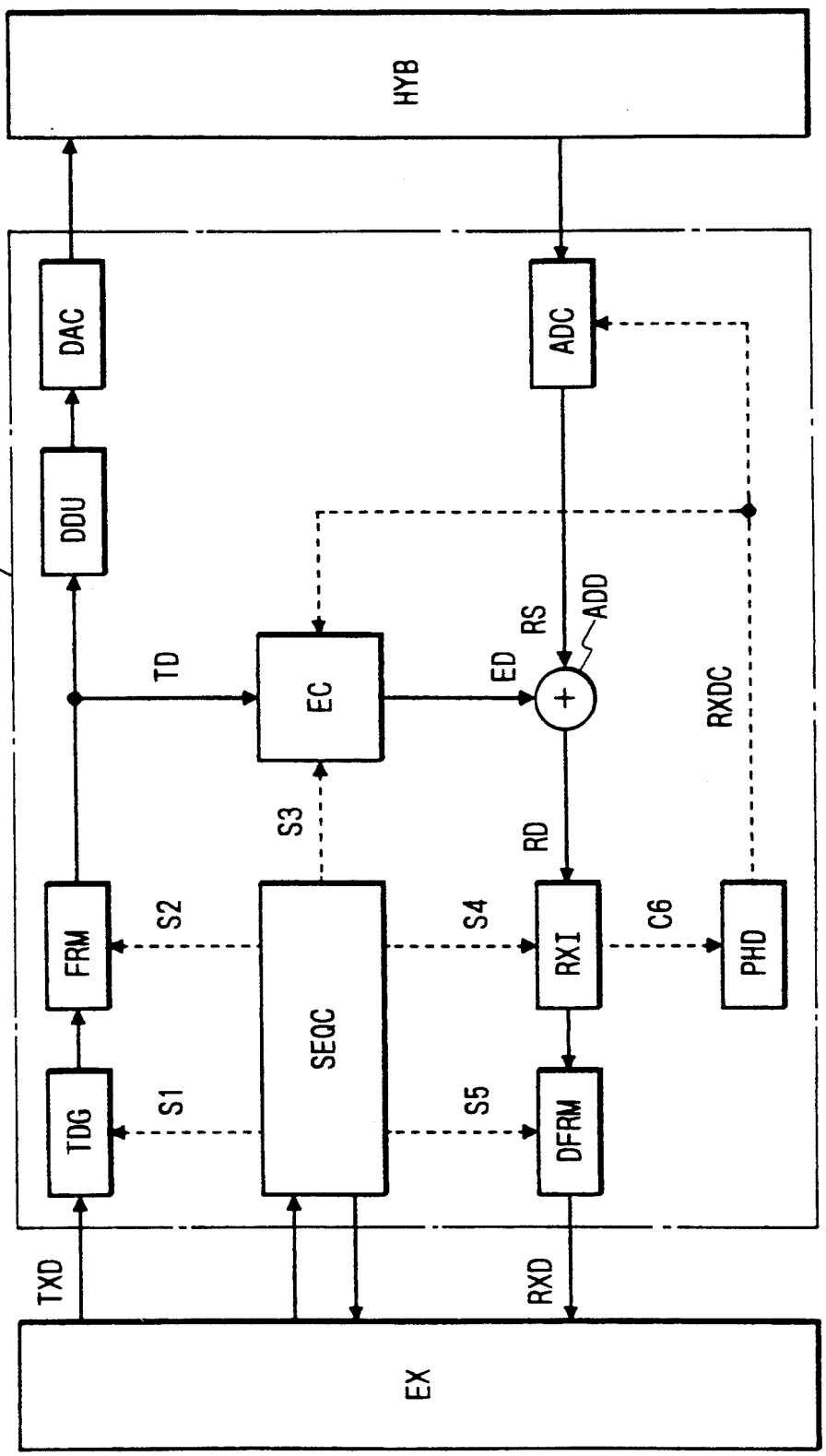
FIG. 19 is a block diagram showing an example of an echo canceler integrated circuit in the prior art.

On the other hand, the echo canceler section EC of this embodiment can be realized by a signal processing unit SPU in stored program system, with no special limitation. The signal processing unit SPU is provided with a multiplier MULT and an arithmetic and logic unit ALU as shown in FIG. 17, and further provided with an input register RI receiving the sending data, that is, the buffer data BD from the sending data buffer TDB, arithmetic registers RA-RC and an accumulator ACC as well as a random access memory RAM. The signal processing unit SPU carries out prescribed signal processing according to a microprogram being read out from an instruction memory ROM (read only memory) not illustrated, and substantially functions as the echo canceler section EC as shown in FIG. 18.

That is, the signal processing unit SPU delays sequentially the sending data TD supplied from the exchanger interface including the frame assembling section FRM by four delay circuits $Z^{-1}$, and then supplies the delayed data to four multipliers MX1-MX4 being provided in accordance with each time slot. These multipliers store the echo noise amount obtained through the receiving data discriminating section RXI in the sending training mode etc. of the subscriber line circuit as echo factors in each time slot. These echo factors are triggered by output signals of corresponding delay circuits $Z^{-1}$, in other words, they are multiplied by output signals of the corresponding delay circuits $Z^{-1}$, and then outputted to a summing device SUM. The summing device SUM estimates the total sum of echo factors being supplied from the multipliers MX1-MX4, and produces the echo data ED and outputs them to an adder ADD. The adder ADD carries out substantial subtraction processing for digital receiving signals RS being supplied from the analog/digital conversion section ADC and echo data ED being supplied from the summing device SUM. As a result, echo components included in the digital receiving signals RS are eliminated, and the components corresponding to substantial receiving data RD only are extracted.

The signal processing unit SPU functions as the above-mentioned echo canceler section EC, and also functions as a sequence control section SEQC, an adder ADD, a receiving data discriminating section RXI and a phase detecting section PHD in FIG. 13.

As shown in the above embodiments, the present invention has been applied to the echo canceler integrated circuit etc. included in a subscriber line circuit of the integrated service digital network, thereby following actions and effects can be obtained.

(1) A sending data buffer for holding sending data temporarily and transmitting them to an echo canceler section is provided between a sending section and an echo canceler section of an echo canceler integrated circuit being included in a subscriber line circuit of integrated service digital network, and the sending data buffer is operated in shift register mode in sending training mode and operated in FIFO register mode in sending/receiving training mode, thereby effect is obtained in that when phase of the sending clock signal leads greatly with respect to the receiving clock signal, the sending data can be prevented from being transmitted with data overlapping to the echo canceler section, and contrarily when phase of the sending clock signal lags greatly with respect to the receiving clock signal, the sending data can be transmitted without data missing to the echo canceler section (2) According to the item (1), effect is obtained in that the echo canceler section operates normally and the phase convergence processing is carried out at high speed, in any of the cases.

(3) According to the items (1) and (2), effect is obtained in that the required time for the training of the subscriber line circuit can be shortened and the overtime can be prevented, without complicating the constitution of the echo canceler integrated circuit.

(4) Effect is obtained in that the invention can be applied also to subscriber devices such as telephone sets, by adding function of switching the delay time to the sending data buffers for delaying the sending data to be outputted, corresponding to the sending data buffer where operation in FIFO register mode for transmitting the sending data to the echo canceler section is made possible.

The invention carried out by the present inventor has been explained concretely with reference to embodiments. However, it is needless to say that the invention is not limited to the embodiments described above, but may be changed variously without departing from the spirit and the scope of the invention. For example, in FIG. 13, the echo canceler integrated circuit may be provided between the subscriber line device installed in the house of the subscriber and the subscriber line SL, and their block constitution may adopt various implemented forms. In FIG. 14, the training method for the subscriber line is not subjected to restriction due to the embodiment, and logic levels of control signal FL in each training mode are not limited. In FIG. 15, the sending data buffer TDB may be provided with data buffers whose number is not more than 4 or not less than 6, and the number of bits for each buffer is arbitrary. Further, a method of storing the sending data TD in all data buffers during sending training mode, and for example, making the data buffers B1 and B2 to be reset and empty condition compulsorily at the time of switching to sending/receiving training mode may be adopted.

In FIG. 16, logic levels for the sending clock signal TXDC and the receiving clock signal RXDC and the clock signals C1-C5 are not limited. In FIG. 17, the signal processing unit SPU is not conditioned necessarily to be made a stored program system, and its block constitution is arbitrary.

The invention implemented by the present inventor has been explained mainly in the case where the invention is applied to the echo canceler integrated circuit of the integrated service digital network being the use field constituting its background, but the application is not limited to the above-mentioned case. It can be applied, for example, to that being produced in unit as echo canceler and various kinds of other equivalent echo cancelers included in subscriber line loops of the service digital network. The invention can be utilized widely in echo cancelers being installed in communication system provided with at least training mode and eliminating echo components accompanying with the sending data and semiconductor integrated circuit devices including such echo cancelers.

A sending data buffer for holding sending data temporarily and transmitting them to an echo canceler section is provided between a sending section and an echo canceler section of an echo canceler integrated circuit being included in a subscriber line circuit of the integrated service digital network, and the sending data buffer is operated in shift register mode in sending training mode and operated in FIFO register mode in sending/receiving training mode, thereby even if relatively large phase difference is produced between the sending clock signal and the receiving clock signal, the sending data can be transmitted to the echo canceler section without data overlapping or without data missing. As a result, the training time for a subscriber line circuit including an echo canceler integrated circuit can be shortened, and its overtime can be prevented. Further, the invention can be applied also to subscriber devices such as telephone sets, by adding function of switching the delay time to the sending data buffer for delaying the sending data to be outputted.

What is claimed is:

1. A semiconductor integrated device being coupled between a first station for carrying out digital data processing and a second station for inputting and outputting analog signals, said semiconductor integrated device comprising:

sending means for converting digital data supplied from said first station into analog signals, and for sending the converted analog signals to said second station;

receiving means for converting the analog signals supplied from said second station into digital data, and for supplying the converted digital data to said first station;

storage means for storing the digital data supplied from said first station, wherein said storage means has a shift operation and a first in-first out operation;

arithmetic means for receiving the digital data stored in said storage means, and for carrying out prescribed arithmetic processing; and mode selecting means for selecting one operation from that of said shift and first in-first out operations, wherein said storage means outputs digital data to said arithmetic means according to said one operation selected by said mode selecting means.

2. The semiconductor integrated device according to claim 1, wherein said storage means includes a plurality of flip-flop circuits.

3. The semiconductor integrated device according to claim 2, further comprising a sending training mode for extracting echo components of the analog signals inputted from said receiving means, when outputting of the analog signals from said second station is stopped and the analog signals are outputted from said sending means, and a sending/receiving mode for obtaining optimum phase of the analog signals supplied to said receiving means, when the analog signals are sent from said sending means and said second station carries out outputting of the analog signals, wherein said storage means carries out said shift operation in the sending training mode, and carries out said first in-first out operation in the sending/receiving training mode.

4. The semiconductor integrated device according to claim 3, further comprising delay means being coupled between said first station and said sending means for delaying the digital data supplied from said first station to said sending means.

5. The semiconductor integrated device according to claim 4, wherein said delay means includes a plurality of flip-flop circuits in which the number of flip-flop circuits thereof is the same number as that included in said storage means.

6. The semiconductor integrated device according to claim 5, further comprising adding means for adding the result processed by said arithmetic means to the digital data including echo components supplied from said receiving means, said adding means canceling the echo components.

7. The semiconductor integrated device according to claim 9, wherein said storage means includes clock supply means for receiving the mode selecting signal from said mode selecting means and for supplying clock signals selectively to said plurality of flip-flop circuits contained within said storage means.

8. The semiconductor integrated device according to claim 6, further comprising control means for outputting a control signal to said mode selecting means.

9. The semiconductor integrated device according to claim 8, wherein said mode selecting means outputs a mode selecting signal for indicating one operation from that of said shift and first in-first out operations in response to said control signal.

10. An echo canceler integrated device, which cancels echo components included into a receiving signal, which is coupled to sending means for converting digital data supplied from a first station into analog signals and for sending the converted analog signals to a second station, and which is coupled to receiving means for converting the analog signals supplied from the second station into digital data and for supplying the converted digital data to the first station, wherein the first station performs digital data processing, and wherein the second station inputs and outputs analog signals, said echo canceler integrated device comprising:

storage means for storing the digital data supplied from the first station, wherein the storage means has a shift operation and a first in-first out operation;

arithmetic means for receiving the digital data stored in said storage mean, and for performing prescribed arithmetic processing; and mode selecting means for selecting one operation from that of said shift and first in-first out operations, wherein said storage means outputs digital data to said arithmetic means according to said one operation selected by said mode selecting means.

11. The echo canceler integrated device according to claim 10, wherein the storage means includes a plurality of flip-flop circuits.

12. The echo canceler integrated device according to claim 11, further comprising a sending training mode for extracting echo components of the analog signals inputted from said receiving means, when outputting of the analog signals from said second station is stopped and the analog signals are outputted from said sending means, and a sending/receiving mode for obtaining optimum phase of the analog signals supplied to said receiving means, when the analog signals are sent from said sending means and said second station performs outputting of the analog signals, wherein said storage means carries out said shift operation in the sending training mode, and carries out said first in-first out operation in the sending/receiving mode.

13. The echo canceler integrated device according to claim 12, further comprising delay means, being coupled between said first station and said sending means, for delaying the digital data supplied from said first station to said sending means.

14. The echo canceler integrated device according to claim 13, wherein said delay means includes a plurality of flip-flop circuits in which the number of flip-flop circuits thereof is the same number as that included in said storage means.

15. The echo canceler integrated device according to claim 14, wherein the result processed by said arithmetic means is provided to adding means, wherein said adding means cancels the echo components by adding the result processed by said arithmetic means to the digital data including the echo components supplied from said receiving means.

16. The echo canceler integrated device according to claim 15, further comprising control means for outputting a control signal to said mode selecting means.

17. The echo canceler integrated device according to claim 16, wherein said mode selecting means outputs a mode selecting signal for indicating one operation from that of said shift and first in-first out operations in response to the control signal.

18. The echo canceler integrated device according to claim 17, wherein said storage means includes clock supply means for receiving the mode selecting signal from said mode selecting means and for supplying clock signals selectively to the plurality of flip-flop circuits contained within said storage means.

19. A data communication system comprising a first station for carrying out digital data processing, a second station for inputting and outputting analog signals and a semiconductor integrated device being coupled between said first and second stations, said semiconductor integrated device comprising:

sending means for converting digital data supplied from said first station into analog signals, and for sending the converted analog signals to said second station;

receiving means for converting the analog signals supplied from said second station into digital data, and for supplying the converted digital data to said first station;

storage means for storing the digital data supplied from said first station, wherein the storage means has a shift operation and a first in-first out operation;

arithmetic means for receiving the digital data stored in said storage means and for carrying out prescribed arithmetic processing; and mode selecting means for selecting one operation from that of said shift and first in-first out operations, wherein said storage means outputs digital data to said arithmetic means according to said one operation selected by said mode selecting means.

20. The data communication system according to claim 19, wherein said storage means includes a plurality of flip-flop circuits.

21. The data communication system according to claim 20, further comprising a sending training mode for extracting echo components of the analog signals inputted from said receiving means, when outputted of the analog signals from said second station is stopped and the analog signals are outputted from said sending means, and a sending/receiving mode for obtaining optimum phase of the analog signals supplied to said receiving means, when the analog signals are sent from said sending means and said second station carries out outputting of the analog signals, wherein said storage means carries out said shift operation in the sending training mode, and carries out said first in-first out operation in the sending/receiving mode.

22. The data communication system according to claim 21, further comprising delay means being coupled between said first station and said sending means for delaying the digital data supplied from said first station to said sending means.

23. The data communication system according to claim 22, wherein said delay means includes a plurality of flip-flop circuits in which the number of flip-flop circuits thereof is the same number as that included in said storage means.

24. The data communication system according to claim 23, wherein the result processed by said arithmetic means is provided to adding means, wherein said adding means cancels the echo components by adding the result processed by said arithmetic means to the digital data including the echo components supplied from said receiving means.

25. The data communication system according to claim 24, further comprising control means for outputting a control signal to a mode selecting means.

26. The data communication system according to claim 25, wherein said mode selecting means outputs a mode selecting signal for indicating one operation from that of said shift and first in-first out operations of said storage means in response to the control signal.

27. The data communication system according to claim 26, wherein said storage means includes clock supply means for receiving the mode selecting signal from said mode selecting means and for supplying clock signals selectively to said plurality of flip-flop circuits contained within said storage means.

* * * * *